(12) United States Patent
Reed et al.

(10) Patent No.: US 6,544,460 B2
(45) Date of Patent: Apr. 8, 2003

(54) METHOD AND FIXTURE FOR DISPOSING FILLER MATERIAL IN AN ARTICLE

(75) Inventors: Gordon M. Reed, Plantsville, CT (US); Kenneth M. Boucher, Branford, CT (US); Stanley J. Funk, Plainville, CT (US)

(73) Assignee: United Technologies Corporation, Hartford, CT (US)

( * ) Notice: Subject to any disclaimer, the term of this patent is extended or adjusted under 35 U.S.C. 154(b) by 197 days.

(21) Appl. No.: 09/798,194

(22) Filed: Mar. 2, 2001

(65) Prior Publication Data

US 2001/0008323 A1 Jul. 19, 2001

Related U.S. Application Data

(63) Continuation-in-part of application No. 09/213,592, filed on Dec. 17, 1998, now Pat. No. 6,224,361, and a continuation-in-part of application No. 09/213,690, filed on Dec. 17, 1998, now Pat. No. 6,251,315.
(60) Provisional application No. 60/109,176, filed on Nov. 20, 1998.

(51) Int. Cl.$^7$ .................. B29C 45/14; B29C 45/80
(52) U.S. Cl. ............ 264/267; 264/275; 264/328.1; 425/110; 425/472
(58) Field of Search .................... 264/267, 275, 264/328.1; 425/110, 472

(56) References Cited

U.S. PATENT DOCUMENTS

| | | | | |
|---|---|---|---|---|
| 4,594,761 A | * | 6/1986 | Murphy et al. | 29/156.8 R |
| 5,912,024 A | * | 6/1999 | Bolanos et al. | 425/116 |
| 6,139,303 A | * | 10/2000 | Reed et al. | 425/116 |

* cited by examiner

Primary Examiner—Stefan Staicovici
(74) Attorney, Agent, or Firm—Gene D. Fleischhauer

(57) ABSTRACT

A fixture for disposing laser blocking material on the interior of an airfoil is disclosed. Various construction details are developed which allow for the repetitive disposition of the laser blocking material in one airfoil after another. In one embodiment, the fixture includes a tool member and a nozzle adaptor for providing a sealing surface to a nozzle which extends into the tool member.

21 Claims, 9 Drawing Sheets

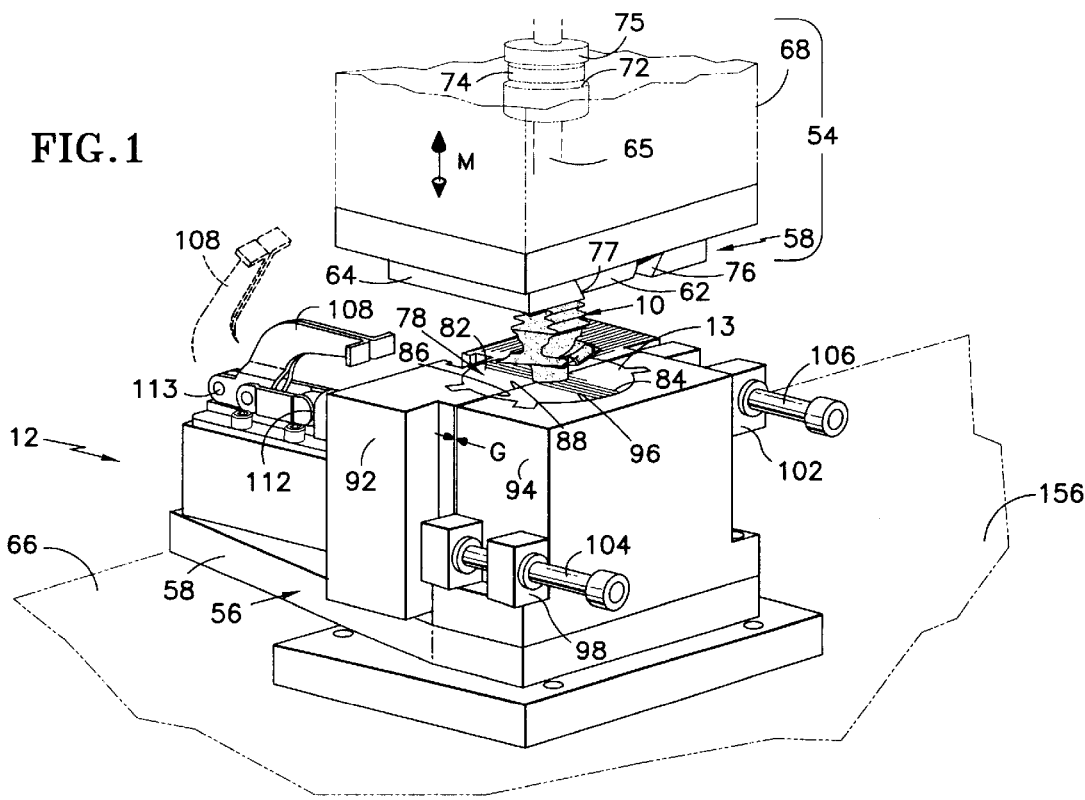
FIG.1
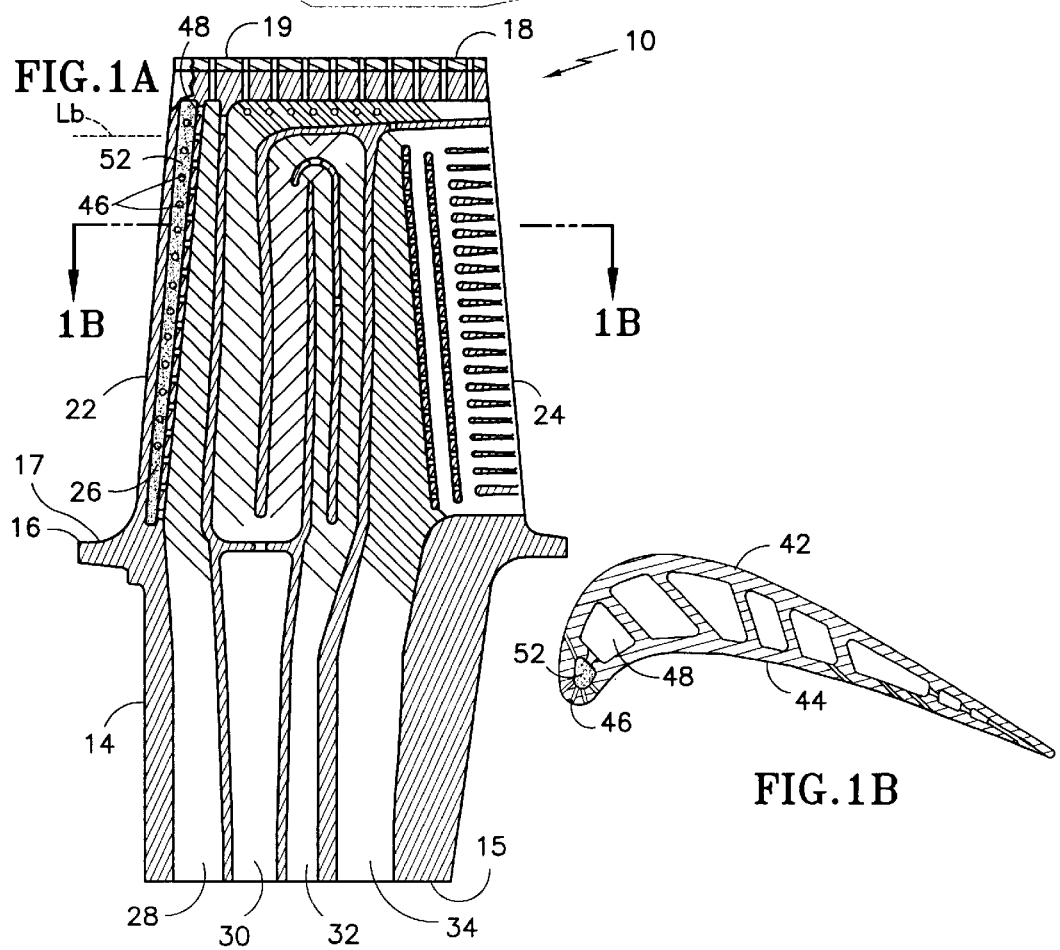
FIG.1A
FIG.1B

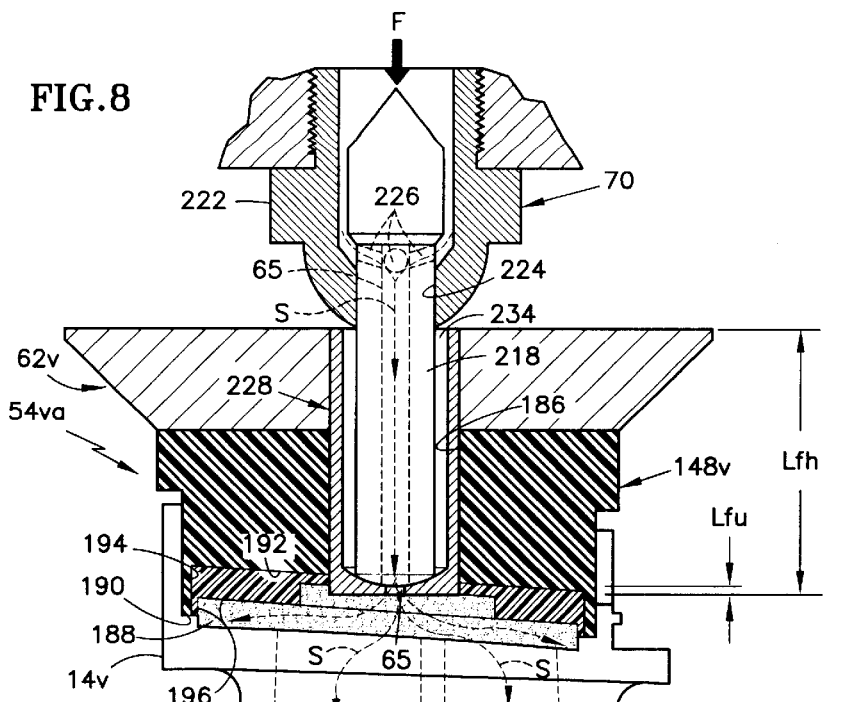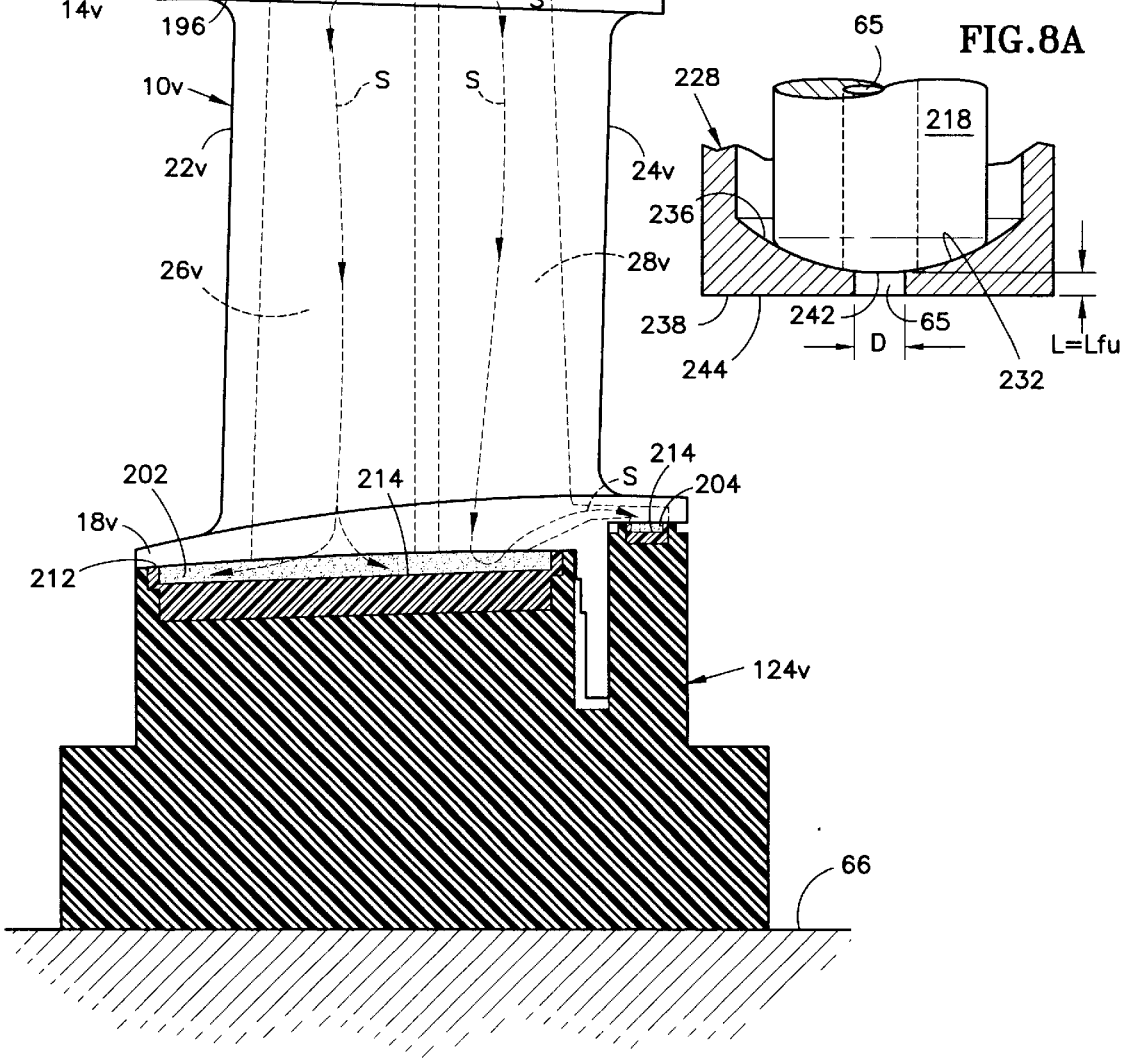

METHOD AND FIXTURE FOR DISPOSING FILLER MATERIAL IN AN ARTICLE

CROSS-REFERENCE TO RELATED APPLICATIONS

Pursuant to 37 CFR section 1.53, the subject matter claimed herein is a continuation-in-part of earlier filed applications U.S. application Ser. No. 09/213,592, now U.S. Pat. No. 6,224,361 and U.S. application Ser. No. 09/213,690, now U.S. Pat. No. 6,251,315, both of which were filed Dec. 17, 1998 and both of which claim the benefit of U.S. Provisional Application No. 60/109,176 filed on Nov. 20, 1998.

This application relates to once copending U.S. applications Ser. No. 09/213,591 entitled "Method and Material for Processing a Component for Laser Machining", by Foster Philip Lamm et al. now U.S. Pat. No. 6,329,633 B1; Ser. No. 09/213,580 now U.S. Pat. No. 6,177,038 B1 entitled "Method for Orienting an Airfoil for Processing and for Forming a Mask for the Airfoil", by Gordon M. Reed et al.; and Ser. No. 09/213,593 now U.S. Pat. No. 6,139,303 entitled "Fixture for Disposing a Laser Blocking Material in an Airfoil" by Gordon M. Reed et al.

TECHNICAL FIELD

This invention relates to a fixture for disposing a material on an airfoil or in an airfoil for an axial flow rotary machine. The material is heated to liquefy the material and the material is flowed to passages in the airfoil where the material solidifies to block, for example, a coating from entering the passage or a laser beam from striking the interior of the passage as a cooling air hole is drilled through to the passage. The material is commonly referred to as "filler material" or "blocking material" and is disposed on the interior or exterior of the airfoil. More particularly, this invention relates to a fixture for disposing filler material in passages in the airfoil, such as passages in a rotor blade or a stator vane, which are the relatively large supply passages or the relatively small passages which provide conduits from the supply passage to the interior or exterior of the airfoil. Although this invention was developed in the field of axial flow rotary machines, this invention has application to other fields where a material is heated to liquefy the material and is flowed thereafter to the article where the material is disposed on or in the article.

BACKGROUND OF THE INVENTION

Airfoils for gas turbine engines are disposed in a flow path for working medium gases. Examples of such airfoils are turbine blades and turbine vanes. The airfoils are bathed in hot gases as the gases are flowed through the engine. Cooling air is flowed though main supply passages on the interior of the airfoil under operative conditions. Stator vanes are typically larger than rotor blades and the main supply passages for cooling air in a turbine vane are larger in volume than the supply passages in a rotor blade.

The cooling air is then flowed from these passages through the airfoil to keep the temperature of the airfoil within acceptable limits. Cooling air holes also extend from the interior to the exterior of the airfoil. These cooling air holes are typically called "film cooling holes." The cooling air holes are small and may have diameters that are in a range of eleven to seventeen mils (0.011–0.017 inches). Cooling air is flowed from the passages on the interior of the airfoil through the cooling air holes the hot walls to the exterior surface of the airfoil. The cooling air provides transpiration cooling as the air passes through the wall and, after the air is discharged from the airfoil, provides film cooling with a film of air on the exterior. The film of cooling air provides a barrier between the airfoil and the hot, working medium gasses.

The holes are drilled in predetermined patterns and are contoured to ensure adequate cooling of the airfoil. One way to drill the holes uses a laser to direct a beam of coherent energy at the exterior of the airfoil. The intense radiation from the laser beam burns through the wall of the airfoil, leaving behind a hole which provides a satisfactory conduit for cooling air. As the laser beam penetrates through the airfoil wall into an interior cavity, the laser beam may strike adjacent structure on the other side of the cavity causing unacceptable damage to the airfoil. Accordingly, blocking material may be disposed in the cavity to block the laser beam from striking walls bounding the cavity after the beam penetrates through the airfoil wall.

One approach is to leave disposed within the airfoil the ceramic casting core around which the blade is poured during the manufacturing process. The ceramic core provides a suitable blocking material. The ceramic core is subsequently removed by well known leaching techniques. This approach is described in U.S. Pat. No. 5,222,617 entitled "Drilling Turbine Blades" issued to Gregore, Griffith and Stroud.

Another example of a filler material used for blocking material is wax or a wax-like material. The material is melted so that it may easily flow into interior passages, such as the leading edge passage of the airfoil. The temperature of the molten material when heated above its melting point may exceed two hundred and fifty degrees Fahrenheit (250°). The molten material may be poured by hand or injected into the cavity or may even be sprayed or painted on the surface to be protected. However, the molten material may severely scald personnel working with the material. Moreover, the operation is time consuming if such material is poured by hand into the airfoil.

One example of a wax-like blocking material which uses an additive to avoid forming voids is discussed in U.S. Pat. No. 5,049,722, issued to Corfe and Stroud, entitled "Laser Barrier Material And Method Of Laser Drilling." In Corfe, a PTFE (polytetrafluoroethylene) wax-like material is disposed in a wax base. The PTFE helps avoid the formation of voids.

Still another approach is to use a masking agent, such as an epoxy resin, which is disposed in the airfoil in a fluid state. The epoxy resin is disposed in the airfoil by simply pouring the resin into the airfoil. The epoxy resin is at room temperature and poses no scalding hazard to personnel. The epoxy resin is further processed to harden the fluid and cause it to become a more solid material similar to the PTFE wax mentioned in U.S. Pat. No. 5,049,722. However, the resin is relatively viscous compared to molten wax and has difficulty in flowing through small connecting passages on the interior of the airfoil.

Another approach is to use a thixotropic medium that includes material for dispersing laser light. This approach is discussed in U.S. Pat. No. 4,873,414 issued to Ma and Pinder entitled "Laser Drilling of Components". A particular advantage of this medium is that the dispersant material emits light when contacted by the laser light. Monitoring the light provides a method of detecting the presence of the laser beam as the laser beam breaks through the surface of the article and controlling the beam by using a feedback control to determine whether or not the laser beam has drilled a through hole. In addition, the viscosity of the medium is decreased by forcing the medium through a nozzle for lowering the viscosity of the medium so that the medium flows readily over an inner surface of the component.

Another approach is shown in U.S. Pat. No. 5,140,127 entitled "Laser Barrier Material" issued to Stroud and Corse. This approach uses an injectable barrier material which is a composition selected from the group consisting of a first copolymer of tetrafluoroethylene and hexfluoropropylene and a second copolymer having a polytetrafluoroethylene backbone and a least one fluorinated alkoxy side group. The material is poured or injected into the interior of the component.

Another approach is shown in U.S. Pat. No. 5,767,482 entitled "Laser Barrier Material and Method" issued to Turner. Turner uses finely divided crystalline material such as sodium chloride (salt), or other metal salts which are thermally stable and possess a high melting point. Salt may be introduced into the interior of a component by pouring or by making it a paste with water and injecting it. The salt is removed by washing the component with water.

The above art notwithstanding, scientists and engineers working under the direction of Applicants Assignee have sought to develop materials, methods, and devices for disposing a filler material in or on an article, such as for blocking a laser beam on the interior of airfoils which are useable for mass production operations and that provide for relatively easy removal from the article without performing several time consuming operations.

SUMMARY OF INVENTION

This invention is in part predicated on the recognition that fixtures used with polymer filler material that is heated to liquefy the material in mass production operations may provide significant production advantages by reducing the time needed to fill articles. The term "heated" refers to raising the temperature of the material whether by the transfer of heat or by doing work on the material, such as forcing the material through a nozzle. These fixtures may be used, for example, for filling the interiors of airfoils for gas turbine engines with a blocking material for a laser beam. This invention is also in part predicated on the realization that heating such filler material for disposing the material on an exterior surface or in a relatively large internal volume of an article may result in the material unacceptably pulling away from the article as the filler material cools and contracts. It is also predicated in part on realizing that adhering a filler material to such an article may reduce or avoid having the material pull away and, concomitantly, may have a beneficial effect when performing laser drilling operations on an article such as an airfoil. This invention is also predicated in part on the realization that some airfoils, such as stator vanes, may require fixtures that engage the stator vane with a relatively soft material that resiliently deforms to accommodate tolerance variations at faying locations engaged by the fixture. This may occur because the location has not been finally machined until after the cooling holes are drilled. It is also predicated on recognizing that the filler material may bond so well to the soft material that separating the fixture from the airfoil may unacceptably remove portions of the filler material from the airfoil. This invention is also predicated in part on the recognition that having an unheated supply passage in a fixture for receiving and supplying a heated filler material that adheres to an airfoil may result in plugging the supply passage if the flow of the filler material is interrupted for even short periods of time such as occurs during the sequential filling of airfoils. In addition, it is also predicated on the realization that the pressure an injection means may apply to the filler material may not exceed levels needed to clear the plug because of limitations in delivery pressure imposed by the construction of the machine or limitations in delivery pressure imposed by the difference in pressure between the interior and exterior of the airfoil that the airfoil walls can tolerate. It is also predicated in part on realizing that decreasing the spanwise length of the adhering of the plug of filler material decreases the pressure needed to remove the plug. Finally, it is predicated in part on the realization that flowing a small volume of cured or partially solidified filler material which might adhere to the walls of the passage will provide acceptable results in a filled airfoil providing that the volume of filler material in which the small plug of filler material is disposed downstream of the passage will supply enough heat to remelt the filler material or soften the filler material provided that the filler material flows to a region in or adjacent to the airfoil that has a sufficient volume of new, heated filler material with sufficient thermal capacitance to remelt the plug.

According to the present invention, a fixture for flowing a stream of heated filler material to an article includes a tool member for resiliently engaging the article to form a containment region for the filler material at the article and includes a nozzle adaptor extending in the tool member for providing a sealing surface for the nozzle and a passage for filler material downstream of the sealing surface which is at a location that is nearer to the containment region than to any point that is located upstream of the tool member.

In accordance with one embodiment of the present invention, the article is an an airfoil, such as a stator vane or rotor blade In accordance with one embodiment of the present attention, the fixture includes a sprue plate which extends laterally to engage the tool member and the nozzle adaptor is part of a sprue plate.

In accordance with one detailed embodiment, a masking material is disposed in the containment region to block the filler material from contacting the tool member.

In accordance with one detailed embodiment, the masking material extends from the containment region and circumferentially about the nozzle adaptor and between the nozzle adaptor and the tool member.

A primary feature of the present invention is a fixture for flowing a stream of pressurized filler material from a nozzle to an article, the fixture having a tool member formed of softer material than the article for resiliently engaging the article. Another feature is a containment region for receiving filler material which is bounded by the tool member and the article. Still another feature is a passage which extends through the tool member for flowing the filler material to the containment region. Another feature is a second member which has a portion of the passage. The second member has a sealing surface for engaging the nozzle which is formed of a harder material than the tool member. The sealing surface is nearer to the containment region than to any point upstream of the tool member. In one embodiment, a feature is an opening in the tool member which adapts the tool member to receive the nozzle. In one embodiment, the second member is a sprue plate. The sprue plate has a nozzle adaptor which extends into the tool member and has the sealing surface which is adapted to receive the nozzle. In one embodiment, a feature is an opening in a portion of the sprue plate through which a nozzle extends for engaging the nozzle adaptor.

A primary advantage of the present invention is the reduced cost and efficiency that results from repetitively filling articles with a filler material from a nozzle using a fixture that resiliently accommodates tolerance variations in the article with one material and has a harder sealing surface in close proximity to the article. Another advantage is the speed and cost of sequentially filling airfoils through a fixture with an adhesive filler material by avoiding blockages in a passage through the fixture that must be removed manually by the operator. In one embodiment, an advantage is the cost and quality of laser drilled holes in an airfoil which results from using a heated, adhesive filler material as a laser blocking material and having the ability to repetitively deliver the adhesive filler material to airfoils in quantity.

The foregoing features and advantages of the present invention will become more apparent in light of the following detailed description of the invention and the accompanying drawings.

BRIEF DESCRIPTION OF DRAWINGS

FIG. 1 is perspective view in full of a component, such as an airfoil; of a tool for disposing laser blocking material in the component; and, in phantom, of a portion of a source of laser blocking material, such as an injection molding machine.

FIG. 1A is a side elevation, cross sectional view of the airfoil shown in FIG. 1.

FIG. 1B is a cross-sectional view of the airfoil shown in FIG. 1A taken along the lines 1B—1B of FIG. 1A.

FIG. 8 is a cross-sectional view of an alternate embodiment of the fixture shown in FIG. 7 taken along the line 8—8 of FIG. 7.

FIG. 8A is enlarged view of a portion of FIG. 8.

DETAILED DESCRIPTION OF THE INVENTION

FIG. 1 is a partial perspective view of an article, such as a component for a gas turbine engine as represented by an airfoil 10. FIG. 1 also shows a tool 12 for disposing a filler material on or in the airfoil, such as a laser blocking material on the interior of the component. The tool has a cavity 13 in which airfoils are disposed repetitively as, one after another, the airfoils are filled. The term "airfoil" includes turbine blades, stator vanes and other components having flow directing surfaces.

Figure 7:
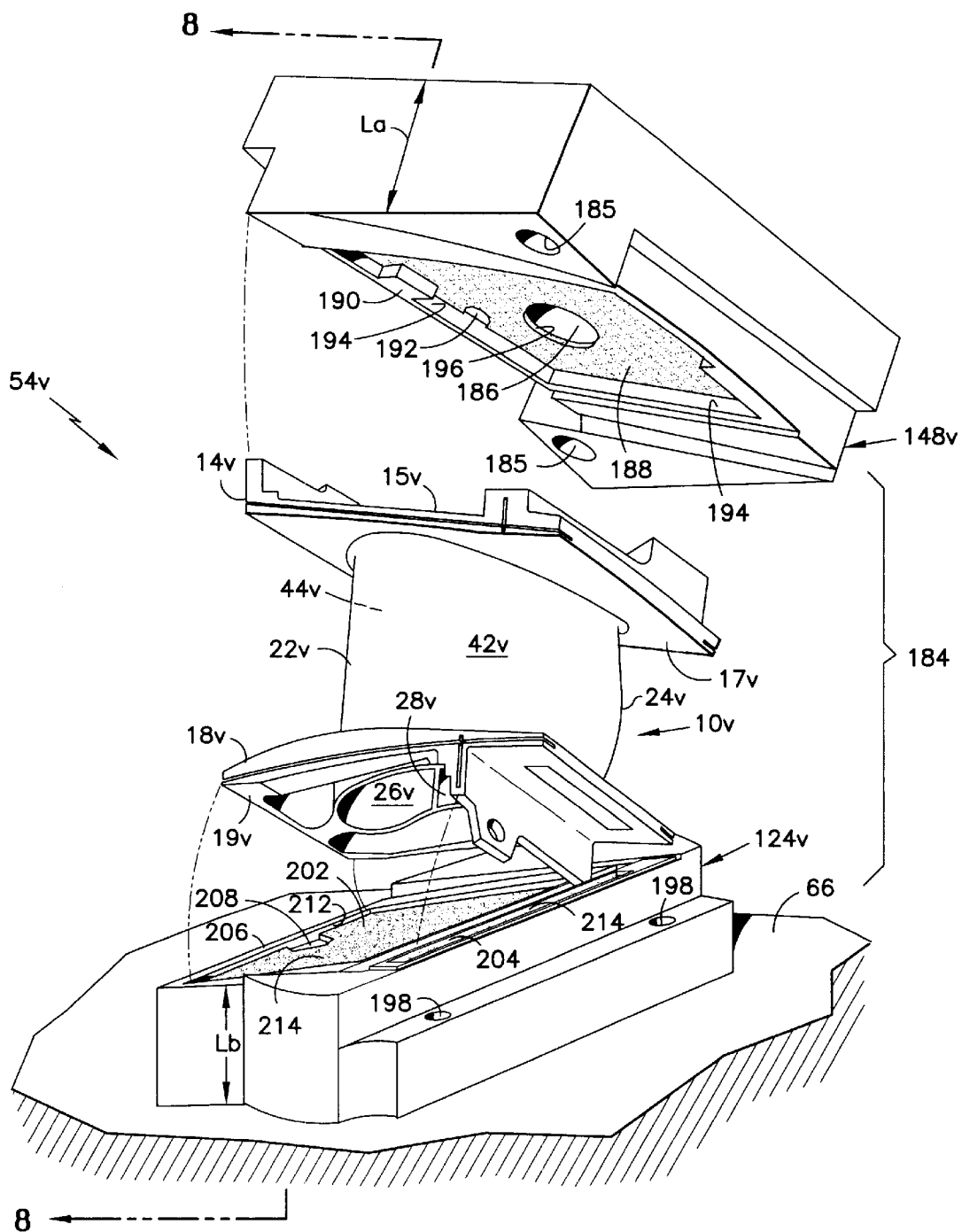
FIG. 7 is a perspective view in exploded fashion showing a portion of an alternate embodiment of the fixture shown in FIG. 1 and an alternate embodiment of the airfoil.

FIG. 1A is a side elevation cross sectional view of the rotor blade 10 during manufacture. FIG. 7 includes a perspective view of a stator vane 10$\nu$. The rotor blade 10 and the stator vanes 10$\nu$ have analogous structural features. The analogous features are described for each of the airfoils by using the same reference number and adding the reference letter "v" for features on the stator vane. The rotor blade has: a first end 14, as represented by the root, having a spanwise facing surface 15; a platform 16 having a spanwise facing surface 17; and a second end 18, as represented by the tip, having a spanwise facing surface 19. The rotor blade has an aerodynamic leading edge 22 which extends spanwise. An aerodynamic trailing edge 24 is spaced chordwise from the aerodynamic leading edge. The airfoil has a plurality of cavities or passages for cooling air as represented by the leading edge passage 26 and passages 28, 30, 32, 34 which extend through the root of the rotor blade. The passages 28, 30, 32, and 34 extend into the interior of the rotor blade and often extend in serpentine fashion as represented by the passage 32.

FIG. 1B is a cross sectional view taken chordwise along the line 1B—1B of FIG. 1A. The airfoil has flow directing surfaces, as represented by the suction surface side or sidewall 42 and the pressure surface side or sidewall 44. Each of these surfaces extend rearwardly from the leading edge to the trailing edge and extend spanwise between the platform 16 and the tip 18.

A plurality of internal impingement holes, as represented by the hole 48, connect the leading edge passage 26 in the leading edge region with the supply passage 28 for cooling air. The impingement holes are of small size and have a hydraulic diameter that is typically less than forty (40) mils (that is, $D_h = 4\, Ai/P = 0.040$ inches, where A is the area of the hole and P is the perimeter of the hole). In some applications, the holes may have a hydraulic diameter that is less than thirty (30) mils. A plurality of film cooling holes adjacent the leading edge 22, as represented by the holes 46, extend from the impingement passage 26 in the leading edge region to the exterior of the rotor blade. As shown in FIG. 1A, one way of forming the film cooling hole 46 is to drill the hole with a laser beam, as represented by the laser beam Lb. The hole is drilled from the exterior of the airfoil (rotor blade) to the leading edge passage 26. FIG. 1A and FIG. 1B show a filler material in schematic fashion which is disposed in the airfoil. The filler material, as represented by a laser blocking material 52, is disposed in the leading edge passage on a portion of the component for attenuating the intensity of the laser. The laser blocking material 52 ensures that the laser beam does not injure structure that faces the cooling air hole as the laser beam breaks through the wall of the rotor blade during the drilling process. The filler material might be added for other purposes, which might include blocking the deposit of a coating.

As shown in FIG. 1, means for supplying the blocking material under pressure, as represented by part of an injection-molding machine 54, is in flow communication with the tool 12. The machine includes means for heating the filler material (not shown), such as heating coils. Alternate equivalent machines include any machine capable of being a source of pressurized laser blocking material to the airfoil such as transfer molding machines and plastic extrusion machines.

The tool 12 includes a fixture 56 for engaging the rotor blade and filling the rotor blade with laser blocking material. The term "filling" means to dispose or supply the material on or to the airfoil and includes partially filling the airfoil such as a rotor blade or stator blade or completely filling the airfoil. The fixture includes a base 58, sprue plate 62 and sprue plate holder 64. A passage 65 for supplying the laser blocking material extends through the sprue plate and sprue plate holder.

Figure 3:
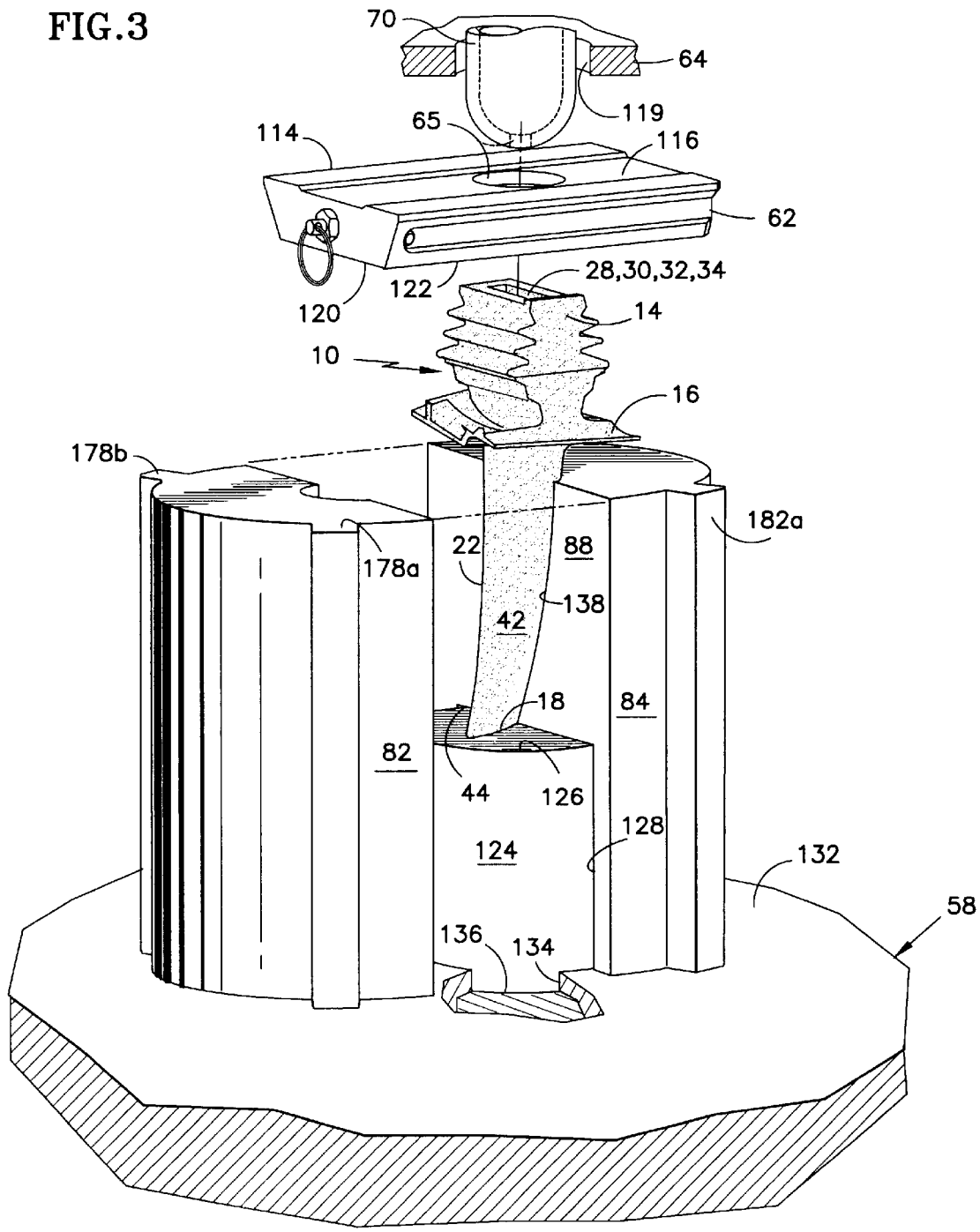
FIG. 3 is an exploded view of part of a nozzle for the injection molding machine and part of the tool shown in FIG. 1, which has a pair of mask members.
Figure 3A:
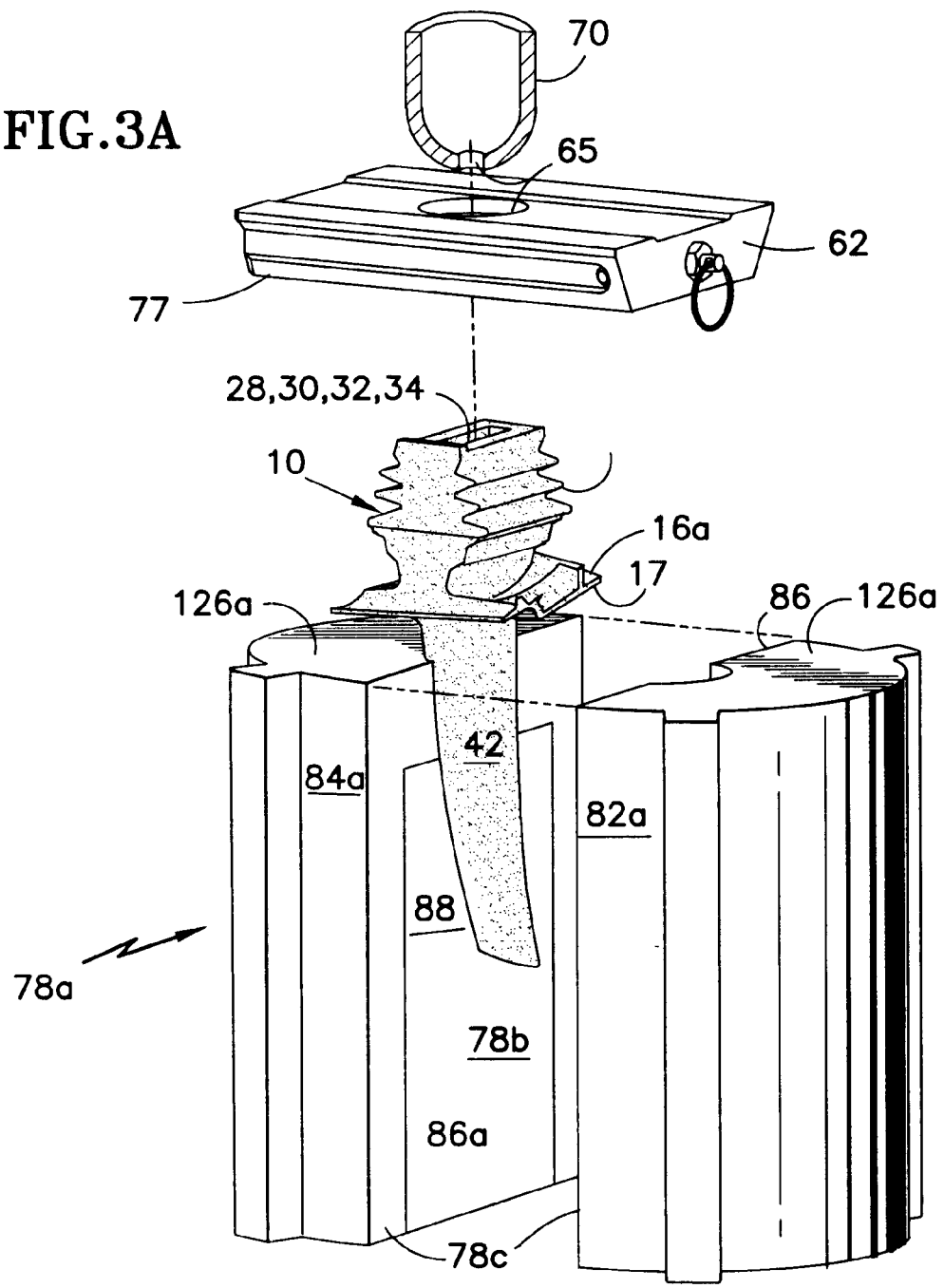
FIG. 3A is alternate embodiment of a portion of the tool shown in FIG. 3A showing mask members formed in part of fairly rigid material which engages the platform of the airfoil shown in FIG. 3.

The injection molding machine has a table 66 for receiving the tool and a housing 68 that has a nozzle 70 as shown in FIG. 3 and FIG. 3A. The housing is movable in the direction M with respect to the tool 12 and can exert a predetermined force on the tool and on the rotor blade. As shown in FIG. 1, the housing has a chamber 72 for receiving a charge 74 of laser blocking material 52 (shown in schematic fashion). The volume of the charge is slightly larger than the internal volume of the interior of the airfoil which is receiving the laser blocking material.

The chamber 72 receives the laser blocking material from a passage (not shown) which has disposed therein screw means (not shown) for forcing the laser blocking material into the chamber 72. A ram or piston 75 is disposed in the chamber. Under operative conditions, the piston drives the laser blocking material in the housing portion of the passage 65 through the housing to the sprue plate 62. One satisfactory machine for this purpose is the Model 70 Injection Molding Machine available from the Mini-Jector Machinery Corp., Newbury, Ohio. Another machine which has proven satisfactory is the Toyo Plastar TI-90G2 injection molding machine available from the Hitachi Group through Toyo of America, 16 Chapin, Pinebrook N.J. 07053.

As shown in FIG. 1, the sprue plate holder 64 of the tool 12 is integrally joined, such as by bolts (not shown), to the housing 68 of the injection molding machine 54. The sprue plate holder has a dove tail slot 76. The sprue plate 62 slidably engages the sprue plate holder through the dovetail slot and has tapered edges 77 which cooperate with the dovetail slot to retain the sprue plate. The sprue plate has part of the passage 65 for receiving the laser blocking material. The passage places the chamber 72 of the injection molding machine in flow communication with the passages 28, 30, 32, 34 which extend through the root 14 of the turbine blade 10.

The table is adjustable with respect to the housing 68 of the injection molding machine 54. The base 58 of the tool 12 is located in predetermined fashion with respect to the table 66. The base is adapted by locating dowels or locating pins (not shown) for this purpose to precisely engage the table at the same location each time that the fixture is installed on the table. Accordingly, the tool base is adjustable through the table with respect to the housing.

The tool includes a mask 78. The mask has a pair of mask members, as represented by the first mask member 82 and the second mask member 84. The mask members each have a surface, as represented by the first surface 86 of the first mask member and the second surface 88 of the second mask member. The surfaces each conform to the exterior of the airfoil. The mask members are formed of elastomeric material such as room temperature vulcanized (RTV) rubber. One satisfactory elastomer is material is RTV 668 Elastomeric material available from the General Electric Company, Waterford, N.Y.

The tool further includes a pair of opposed jaws as represented by the first jaw 92 and the second jaw 94. Each jaw engages an associated mask member 82, 84 for urging the mask member into a faying relationship with the airfoil 10. For example, the second jaw 94 engages the second mask member 84. Because the second jaw is fixed to the base of the tool, the second jaw provides a reference surface 96 with respect to both the housing 68 and to the second mask member 84. The housing positions the sprue plate. Accordingly, the second jaw with its chordwise facing reference surface provides, in combination with the sprue plate and the sprue plate holder, a precise way of aligning the rotor blade with the injection molding machine during the filling operation.

The jaws 92, 94 are capable of relative movement with respect to each other. As shown by the phantom lines in FIG. 1, the first jaw is movable with respect to the second jaw from the closed position shown in full to an open position shown in phantom. The second jaw 94 has a pair of guides for such movement disposed on each side of the jaw, as represented by the guides 98 and the guides 102. The first jaw 92 has a first guide rail 104 which slidably engages the first pair of guides 98. The first jaw has a second guide rail 106 which slidably engages the second pair of guides 102. Alternatively, such relative movement might be accomplished by moving both jaws. As mentioned above, the second jaw provides the reference surface 96 for locating the mask 78 with respect to the housing of the injection molding machine. This feature might be replicated provided the second jaw returns precisely to its closed position.

The tool includes means for moving the jaws from the open position to the closed position, as represented by the arm 108 and lever 112 mechanism shown in FIG. 1. The arm is pivoted about a pivot point 113. As the arm pivots to the open, moved position, the lever pulls the first jaw 92 and the first mask member 82 away from the rotor blade 10 enabling the operator to rapidly remove or insert a rotor blade into the second masking member 84. Other devices for the means for moving the jaw might be actuated by electrical, pneumatic or hydraulic arrangements or mechanical actuators such as chains, pulleys, or springs.

Figure 2:
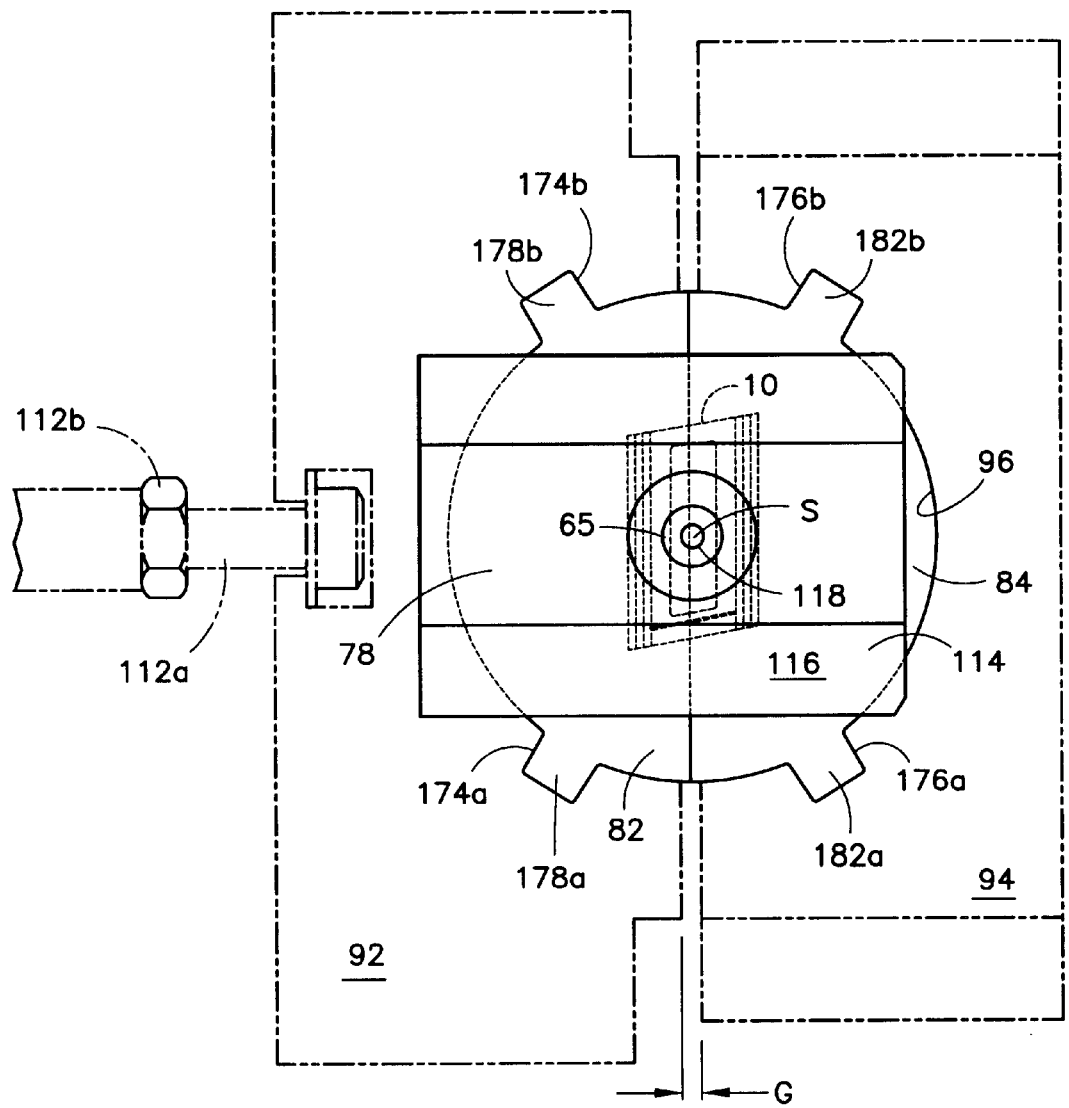
FIG. 2 is a view from above of FIG. 1 with portions of the tool and injection molding machine either broken away for clarity or shown in phantom.

FIG. 2 is a view from above of FIG. 1 with portions of the tool 12 and the injection molding machine broken 54 away for clarity. FIG. 2 shows the relationship of the rotor blade 10 to the sprue plate 62 and to the passage 65 extending spanwise through the sprue plate. The passage adapts the sprue plate to receive the pressurized blocking material from the nozzle 70 of the injection molding machine. The sprue plate has a first side 114 having a first spanwise facing surface 116. The surface 116 faces spanwise away from the rotor blade in the operative condition in a first direction along a spanwise axis S. As shown in FIG. 2, the spanwise axis S is the stacking line of the chordwise sections of the rotor blade. The first surface 116 adapts the sprue plate to engage the nozzle (shown in FIG. 3) and form a seal about the passage 65 for receiving the pressurized blocking material.

The passage 65 has a narrow portion 118 for discharging the pressurized blocking material into the rotor blade 10. The narrow portion of the passage is in flow communication with the opening formed by the passages 28, 30, 32, 34 in the root of the rotor blade. These passages adapt the root to receive the laser blocking material from the injection molding machine.

The first jaw 92 of the tool 12 is shown in phantom. The lever 112 has an end portion 112a (shown in phantom) which engages the first jaw. The lever has an adjustable link 112b which allows for adjustment of the length of the lever. The second jaw 94 (shown in phantom) is spaced from the first jaw by a small gap G in the operative closed condition. This gap is typically small and in one embodiment is less than twenty five to thirty mils (0.025–0.030 inches).

FIG. 3 is an exploded view, partially broken away, showing part of the tool 12 and part of the nozzle 70 of the injection molding machine 54. As shown in FIG. 1 and FIG. 3, the tool includes the fixture 56. The fixture includes the tool base 58, the sprue plate 62, and the sprue plate holder 64. The sprue plate holder has an opening 119. The nozzle 70 extends through the opening 119 to engage the sprue plate 62. The nozzle is pressed against the first surface 116 of the first side 114 by bolts (not shown) which urge the nozzle and sprue plate together. The sprue plate 62 has a second side 120 having a second spanwise facing surface 122.

The fixture 56 also includes a member, as represented by a block 124 (locating block), which is spaced spanwise from the sprue plate. The locating block 124 has a first reference surface 126 which faces in the spanwise direction and which engages the second end or tip 18 of the airfoil 10 in the operative condition. The locating block is formed of a material that is softer than the tip of the airfoil to avoid damaging the tip of the airfoil. The second mask member is adapted by a first opening 128 to receive the block of material. As shown, the locating block is nested (put snugly inside) the second mask member 84 and helps the second jaw locate the second mask member.

The tool base 58 has a surface 132. The first mask member 82 and second mask member 84 rest on the surface 132. The tool base has a locating hole 134 and a base reference surface 136 bounding the bottom of the hole for positioning the locating block 124. The locating block is disposed in the circular hole in the tool base to precisely locate the block of material with respect to the tool base of the fixture. In an alternate embodiment, the tool base might be the member having the first reference surface 126 for engaging the tip of the airfoil and would use the base reference surface 136 for this purpose.

The second mask member 128 has a second opening 138 which conforms to an aerodynamic edge of the airfoil, such as the leading edge 22 of the airfoil. The second mask member overlaps the leading edge of the airfoil on both the suction side 42 and the pressure side 44 of the airfoil. This engagement aids the mask in supporting and positioning the airfoil as the mask members are moved relative one to the other and moved into engagement with the airfoil. In an alternate embodiment, the mask might overlap both edges or only the trailing edge 24 of the airfoil.

FIG. 3A is an alternate embodiment of the fixture shown in FIG. 3 having a mask 78a. The mask 78a has a first mask member 82a and a second mask member 84a. The mask 78a may be formed with a pliant material at the faying surfaces of the airfoil, such as a liner 78b, in combination with a reasonably rigid support 78c of material of the type used for the locating block 124. Each mask member has a portion of the first reference surface 126a that engages a spanwise facing surface 17 on the airfoil. As shown, the spanwise facing surface 17 is on the platform 16a of the airfoil. The surface is similar to the spanwise facing surface of the second end or tip 18 of the airfoil in that the surface 16a is adapted to engage the first reference 126a of locating block 124 to position the airfoil in the spanwise direction.

Figure 4:
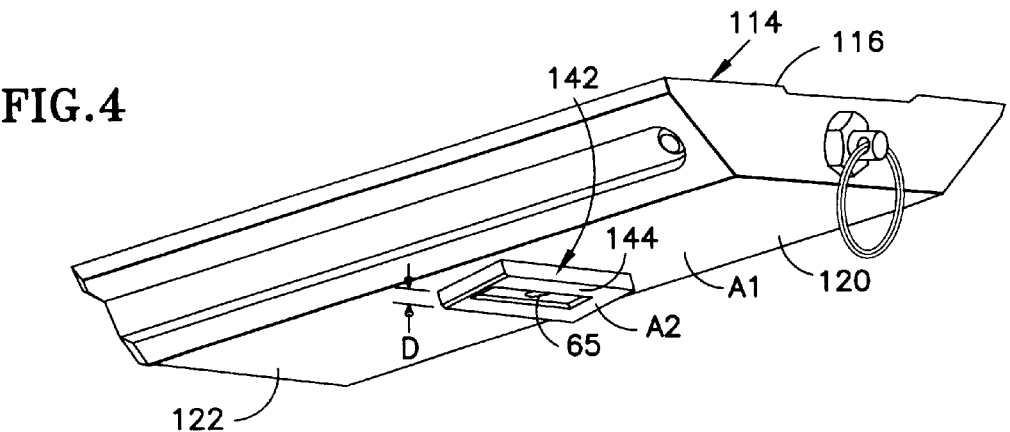
FIG. 4 is perspective view from below of a sprue plate shown in FIG. 1 and FIG. 3.

FIG. 4 is a perspective view from below of the sprue plate 62. The second spanwise facing surface 122 has an area A1. The second surface faces spanwise toward the rotor blade in the operative condition. The second side 120 has a projection 142 which extends in the spanwise direction a distance D which is about sixty (60) mils. The projection extends around the passage 65 to provide a bounded perimeter about the passage. The projection further has a third surface 144 that provides another (second) reference surface that faces in the spanwise direction for engaging the airfoil. The third surface (second spanwise facing reference surface) has a spanwise facing area A2 which is less than the area A1 (A2<A1).

The area A2 provides a sealing area or seal surface to the sprue plate. The third surface 144 having the area A2 (second spanwise facing reference surface) has a surface finish corresponding to a smooth machine finish with a surface roughness Ra measurement of about sixty three (63) micro inches as measured in accordance with the procedures set forth in specification "ANSI B46.1—1985 Surface Texture" available from the American National Standards Institute showing measurements as an average from the mean. The rotor blade has a surface having a finish corresponding to a fine machine finish with a surface roughness finish Ra of about one hundred and twenty five (125) micro inches.

The sprue plate holder 64 is integrally attached to the injection machine such as by fastening means or bonding. The sprue plate 62 is fixed to the sprue plate holder by a set screw or other device for fixing the holder to the plate. In the embodiment shown, fastening means (not shown) urge the sprue plate holder 64 toward the housing 68 of the injection molding machine 54 and the sprue plate holder urges the sprue plate upwardly against the nozzle 70. In the operative condition, the sprue plate and the nozzle 70 of the injection machine are pressed together tight enough to form a seal to block the loss of laser blocking material from the passage 65. The housing of the injection machine pushes downwardly on the sprue plate holder 62 with a force F of about one hundred pounds (100 lbf). This pushes the other side of the sprue plate against the airfoil to form a seal (at the interface between the reduced area A1 and the root of the airfoil). The force F is transmitted through the airfoil and presses the airfoil tip (second end) against the block 124, trapping the airfoil spanwise between the block and the sprue plate.

In an alternate embodiment, the nozzle might press against the sprue plate and that force would urge the sprue plate against the root 14 (second end) of the airfoil. Again, this forms a seal between the sprue plate and the airfoil at the second spanwise facing reference surface 144 of the sprue plate and the root.

As mentioned, the locating block surface 126 (first reference surface) is softer than the tip of the rotor blade so that the tip 18 of the rotor blade is not injured as the injection molding machine presses the airfoil against the block. Under operative conditions, the pressurized material exits the nozzle at a pressure of about sixteen hundred pounds per square inch (1600 psi) and a temperature of about three hundred degrees Fahrenheit (300° F.).

Figure 5:
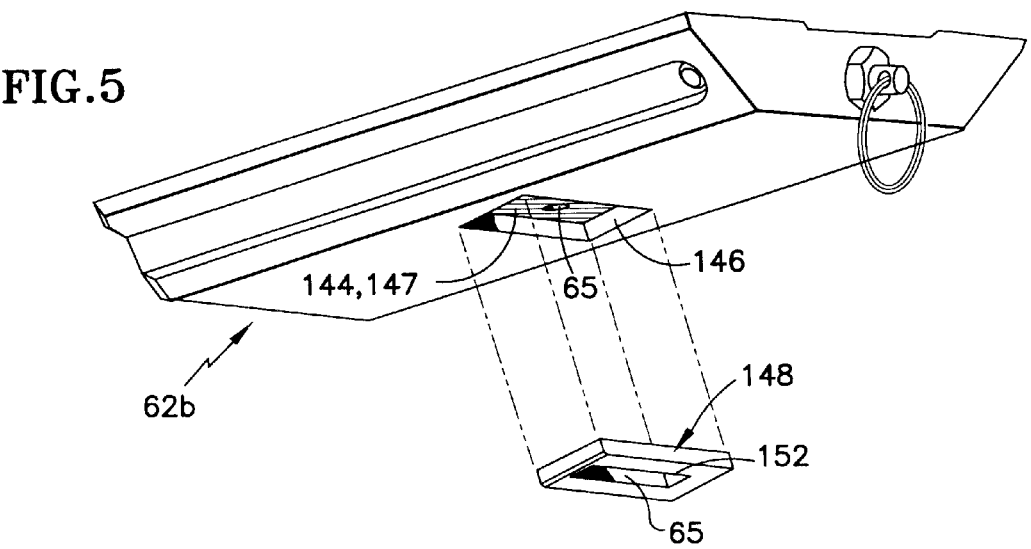
FIG. 5 is a perspective view from below of an alternate embodiment of the sprue plate shown in FIG. 4 having a recess for a seal, and showing in exploded fashion, a seal member which fits in the recess.

FIG. 5 is an alternate embodiment 62b of the sprue plate 62 shown in FIG .4. The sprue plate 62b is formed of a hardened two part epoxy available from the Ciba-Geigy Corporation., 4917 Dawn Avenue, East Lansing, Mich. 48823-5691. The material is supplied as R4036 resin with an R1500 hardener. This is one example of a suitable material for the locating block 124.

The sprue plate 62b shown in FIG. 5 has a recess 146 for receiving the root 14 of the rotor blade. The recess has a seal surface 147 which adapts the sprue plate 62b to receive a polytetrafluoroethylene seal. The polytetrafluoroethylene seal is urged tightly against the sprue plate and against the rotor blade by the injection molding machine. The polytetrafluoroethylene seal has an opening 152 for passing the laser blocking material along the passage 65 from the sprue plate to the rotor blade. In one embodiment, the seal is about three fourths of inch long and one-half of an inch wide with an opening suitable for flowing the blocking material into the root of the airfoil. One satisfactory material for the seal is mechanical grade Teflon® material which has a very small tendency to cold flow. This material is provided in sheet form by Interplast, Inc., One Connecticut Drive, Burlington, N.J. 08016-4101. Interplast is a processor of Dupont Teflon® material.

Figure 6:
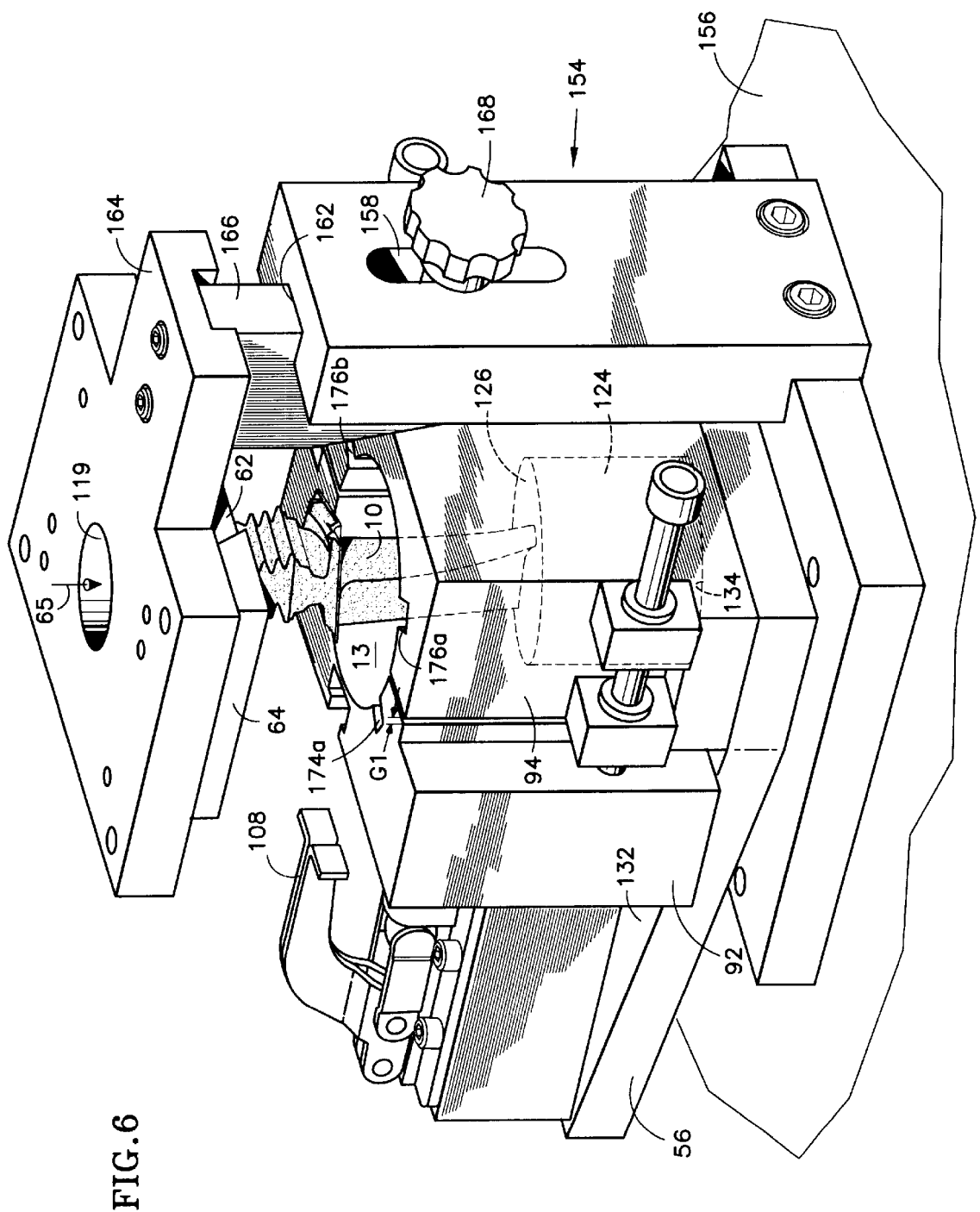
FIG. 6 is a perspective view of the tool shown in FIG. 1 installed on an apparatus for orienting the airfoil with respect to a source of laser blocking material and shows a sprue plate and a sprue plate holder which has been modified slightly to engage the apparatus.

The fixture 56 may be used in the process for orienting airfoil 10 with respect to any machine for injecting laser blocking material, such as the injection molding machine 54. One method for orienting a new airfoil with respect to the injection machine so that like airfoils may be repetitively filled using the tool 12 is described as follows. The first step is to remove the tool 12 from the machine and to install the tool in an apparatus 154 as shown in FIG. 6. The apparatus has a table 156, similar to the table 66 shown for the injection molding machine. The table has locating pins (not shown) which locate the tool in a predetermined relationship to the table. The base of the tool has the locating hole 134 for positioning the locating block 124. The locating block engages the tip of the airfoil with the first reference surface. The combination of the tool 12 and table 158 locate the locating block in a known position with respect to the apparatus so that the tip 18 (second end) of the airfoil is positioned with respect to the apparatus. Airfoils of different length are easily accommodated in the fixture changing the block to a block having a suitable height.

The apparatus has a vertical member 154 having a groove 158. The apparatus has a laterally extending plate 164. The plate has a vertical support 166 which slidably engages the groove. The plate is integrally attached to the vertical support and is adjustable with respect to the vertical member by means of a locking clamp 168. In the embodiment shown, the apparatus plate is adapted to engage the sprue plate holder 64 to locate the sprue plate holder and sprue plate 62 precisely in the spanwise direction with respect to the first reference surface 126 of the locating block and with the same relationship to the first reference surface in the spanwise direction as in the operative condition.

A device, such as a sprue plate element, simulating the sprue plate 62 might be used in place of the sprue plate as long as the device provides the correct orientation of the root (first end) 14 of the airfoil to the first reference surface. The sprue plate element and the sprue plate are each represented by the sprue plate 62 shown in FIG. 6. The advantage of using the sprue plate and the sprue plate holder or a device simulating the sprue plate holder is that it reproduces the engagement of sprue plate in the operative condition to the airfoil and to the other parts of the tool.

The method for orienting the airfoil 10 with respect to the injection molding machine 54 includes forming the fixture so that it has the cavity 13. The cavity adapts the fixture to receive the elastomeric mask members 82, 84 of the mask 78 for engaging the airfoil in the operative condition.

The method includes forming the mask 78 for engaging the airfoil. This includes the steps of forming a core having an airfoil portion which is dimensionally equivalent to the airfoil which is to be filled, at least over that region of the core which engages the mask. Alternatively, an actual airfoil might be used for the core. After disposing the core in the cavity, the plate 164 of the apparatus and the sprue plate 114 are adjusted to orient the sprue plate with respect to the airfoil, to the fixed second jaw 94, and to the first reference surface 126 on the locating block 124. This method includes trapping the core between the sprue plate and the first reference surface such that the orientation of the core to the sprue plate and the core to the first reference surface is the same as in the operative condition.

The method includes disposing a masking material in fluid form in the cavity 13 and allowing the material to harden. One satisfactory material is an elastomeric material such as room temperature, vulcanized material available as R668 from the General Electric Company.

As shown in FIG. 2, the first jaw 92 and the second jaw 94 each have a pair of spanwise extending grooves as represented by the grooves 174a, 174b and the grooves 176a, 176b. The masking material flows into these grooves. This material hardens to form strips on the mask. The strips are represented by the strips 178a, 178b which engage the grooves 174a, 174b of the first jaw and the strips 182a, 182b which engage the grooves 176a, 176b of the second jaw. The strips extend in the grooves and engage the jaws in a chordwise direction substantially perpendicular to the surfaces of the jaws.

After the material hardens, the step of forming the mask 78 includes cutting the masking material in a generally spanwise direction to form a single parting line if a one piece mask is desired or two parting lines if a two-piece mask is desired. The parting line enables removal of the core and insertion of the airfoil in the operative condition.

In the embodiment shown in FIG. 6, two parting lines are made on either side of the airfoil to divide the masking member into the pair of mask members 82, 84. In alternate embodiments, it might be desirable to have more than a pair of mask members. The mask members are cut such that each parting line extends between the cooling air holes of the finally manufactured airfoil. This enables the mask to block the flow of blocking material out of the holes 46 of the airfoil to such an extent that the material does not flow to locating surfaces on the airfoil for the laser drilling operation. This is important in those cases where a repaired airfoil is being redrilled or a newly manufactured airfoil is being reworked and the airfoil already has some cooling holes 46 formed in the surface of the airfoil.

The jaws 92, 94 of the tool are movable relative to each other. The method of orienting the airfoil by forming the mask includes spacing the jaws one from the other by the gap G in the closed position. (The gap G is the distance that the jaws are spaced in the operative condition.) A layer of molding material is disposed between the jaws to fill the gap G. The molding material seals the mold against the loss of masking material in fluid form. One satisfactory material is beeswax. Alternatively, the jaws might be spaced apart by a gap G1 which is greater than the gap G. This might be achieved during the step of forming the mask by not fully closing the jaws. This results in the lateral length of the mask being slightly greater than the lateral width of the cavity in the operative condition. The jaws under operative conditions will then exert a predetermined level of force on the masking member. The same effect might be achieved by adjusting the length of the lever which moves the jaw. This might be done by employing an adjustable link 112b so that the jaws move to the fully closed position with a gap G in the operative condition but are adjusted so that the jaws are spaced apart by the gap G1. One satisfactory gap G1 was set at about one eighth of an inch (125 mils). The gap G1 for the tool in the closed position in one embodiment was about four times of the gap G for the tool in the operative condition.

A particular advantage of the tool 12 is the second jaw 94 which does not move. That jaw and the second chordwise facing reference surface 96 have a predetermined relationship with respect to the locating hole 134 because both are fixed. The locating hole positions, in turn, the locating block 124 having the first reference surface 126. These known relationships cause the mask 78 and its mask members 82, 84 which engage the jaw to have a known relationship with respect to the airfoil (which engages the first reference surface) and the airfoil to the reference surface on the second jaw 96; and, the airfoil and the mask to the sprue plate 62 through the second jaw and the base of the fixture and thence through the table of the apparatus to the housing 62. A small lateral adjustment might be required, for example, in the operative condition, depending on the size of gap G1 as compared to the gap G, to ensure that these components have the correct relationship in the operative condition. Thus, this relationship in the apparatus for making the mask is the same or very easily adjustable to the same relationship as in the operative condition.

FIG. 7 is a perspective view of a portion of an alternate embodiment of the fixture 54 shown in FIG. 1. The fixture is represented by a tool member 184 having a first part 148v and a second part 124v. The fixture is adapted to engage an airfoil, as represented by the stator vane 10v.

The stator vane 10v has: a first end 14v, as represented by the outer platform, having a first surface 15v facing spanwise outwardly and a second surface 17v facing spanwise inwardly. The stator vane has a second end 18v, as represented by the inner platform, having a surface 19v facing spanwise outwardly. The airfoil has an aerodynamic leading edge 22v which extends spanwise between the platforms. An aerodynamic trailing edge 24v is spaced chordwise from the aerodynamic leading edge.

The airfoil 10v has a plurality of cavities or openings for cooling air as represented by the leading edge passage 26v and the trailing edge passage 28v. The passages extend through the first end 14v (outer platform) into the interior of the stator vane and through the second end 18v (inner plafform) of the stator vane. The passages place the first end in flow communication with the second end and are part of the passage 65v for filler material. These spanwise vane passages are typically much larger than the spanwise passages shown in the rotor blade. The walls of the stator vane bounding the vane passages may be thicker and better able to tolerate greater differences in pressure between the interior and the exterior of the stator vane during fabrication.

The airfoil has flow directing surfaces, as represented by the suction surface side or sidewall 42v and the pressure surface side or sidewall 44v. Each of these surfaces extend rearwardly from the leading edge to the trailing edge and extend spanwise between the outer platform 14v and the inner platform 18v.

The stator vane is shown in a prefinished condition prior to final machining of the outer and inner platforms 14v, 18v and prior to the drilling of the cooling holes. Like the rotor blade, the stator vane will have a plurality of internal impingement cooling holes similar to the cooling holes 48 for the rotor blade which are adjacent to the leading edge. The stator vane will also have a plurality of film cooling holes, like the film cooling holes 46 in the rotor blade, which extend from the interior to the exterior surfaces of the airfoil. The cooling holes will typically extend to the surface of the suction side, the pressure side and the platforms. The cooling holes are of small size and have a hydraulic diameter that is of the same order of magnitude as the rotor blade The first part 148v of the tool member 184 acts as a seal member for the first end 14v of the stator vane and is similar to the gasket 148 shown in FIG. 3A. The first part may be attached to a second member, such as a sprue plate 62v which is shown in FIG. 8, by fasteners (not shown) which are disposed in the openings 185. The first part has an average spanwise length La. The length La is selected to provide a durable structure that can withstand the repetitive application of force needed to urge the first part 148v against the first end 14v of the stator vane. The length La is longer than the length of the spanwise extending flanges of the stator vane such that the first part extends from a spanwise location above the stator vane. The first part is urged against the stator vane by the sprue plate 62v which extends chordwise beyond the first part.

The first part is formed of a material which is softer than the material of the stator vane. The resiliency of the material adapts the fixture to resiliently engage the first end of the stator vane under operative conditions. One satisfactory material is a polyurethane elastomer which is particularly suitable for wear resistance and available as RP 6444 REN:C:O-THANE® Polyurea Elastomer available from Vantico Ltd., Duxford, Cambridge, Cambridgeshire, U.K. The elastomer is formed by mixing a resin and a hardener together and allowing the resin and hardener to cure in a suitable mold. The hardness of the material is sixty (60±5 Shore D under ASTM Test Method D-2240) with an ultimate tensile strength of thirty four hundred (3400) psi and an ultimate elongation of three-hundred and twenty-five (325) percent (ASTM test method D-638 at twenty (20) inches per minute) An opening 186 in the first part of the tool member adapts the first part to accommodate a flowpath or stream S of filler material (laser blocking-material) to extend through the first part. The flowpath or stream S is shown in FIG. 8. The first part 148v is spaced from the first end 14v of the stator vane leaving a first containment region 188 therebetween for receiving the filler material 52. The containment region acts as a plenum for distributing the filler (laser blocking) material to needed locations on the stator vane including the ends 14v, 18v of the stator vane and the passages 26v, 28v. The exploded view shows that the containment region is bounded by at least one spanwise facing wall, as represented by the walls 190, 192, and by at least one spanwise extending wall, as represented by the wall 194.

A layer of masking material 196 may be disposed in the first containment region 188 to block the filler material 52 from contacting and adhering to the spanwise facing wall 192. In the embodiment shown, the masking material does not extend to block the filler material from contacting all of the spanwise extending wall 194 which is relatively small in surface area. One satisfactory masking material is an elastomeric material such as room temperature, vulcanized rubber material available as R668 material from the General Electric Company.

The second part 124v of the tool member 184 acts as a seal member for the second end of the stator vane and is similar to the locating block 124 shown in FIG. 3. The second part is formed of the same material as the first part. The second part may be attached to a second member, such as the table 66 which is shown in FIG. 1, by fasteners (not shown) which are disposed in the openings 198. The second part has an average spanwise length Lb. The length Lb is selected to provide a durable structure that can withstand the repetitive application of force needed to urge the second part against the second end of the stator vane. The length Lb is also longer than the length of the spanwise extending flanges of the stator vane such that the second part may be urged against the stator vane by the table 66 of the injection machine which extends chordwise beyond the second part. Finally, the lengths La, Lb are also selected such that portions of the first part 148v and second part 124v have enough overall resiliency to accept some compression and decrease in length. The decrease in length enables other portions of the parts to engage surfaces on the ends whose spanwise location might vary due to tolerance variations in the unfinished part.

The second part 124v is spaced from the second end 18v of the stator vane leaving a second containment region 202 and a third containment region 204 therebetween for receiving the filler material 52. The third containment region is in flow communication through the interior of the stator vane with the second containment region. The containment regions act as plenums for distributing the stream of filler material (laser blocking material) from the passages 26v, 28v to needed locations on the stator vane, such as the end of stator vane.

The exploded view shows that the containment regions 202, 204 are bounded by at least one spanwise facing wall, as represented by the walls 206, 208, and by at least one spanwise extending wall, as represented by the wall 212. Layers of masking material 214 are disposed in the containment regions similar to the disposition of masking material in the first part.

FIG. 8 is a cross-sectional view taken along the lines 8—8 of FIG. 7 of an alternate embodiment 54va of the fixture 54v shown in FIG. 7. In this embodiment, the masking material extends to block the contact of masking material with the spanwise extending walls 194, 212. These walls bound the containment regions 188, 202, 204 of the first part 148v and the second part 124v of the tool member. FIG. 8 also shows the relationship of the nozzle 70 to the fixture 54va and particularly the relationship of the nozzle to the sprue plate 62v and to the tool member 184. As shown in FIG. 1, the sprue plate holder 64 has a slot which adapts the sprue plate holder to receive the sprue plate and has means for preventing relative movement between the sprue plate and the sprue plate holder.

The nozzle 70 is able to move with respect to the sprue plate holder and thus with respect to the sprue plate 62v. The nozzle has a nozzle plug 218 and a nozzle plug carrier 222. The stream of filler material S extends through the nozzle plug and through the fixture to the stator vane 10v and through the stator vane to the ends 14v, 18v of the stator vane. The nozzle plug is in heat transfer communication by conduction along its length and by convection from the charge of filler material with a source of heat (not shown) for supplying heat to the filler material. The nozzle plug carrier is adapted by an opening 224 to slidably engage the nozzle plug. The nozzle plug has a portion of the passage 65 for filler material which includes a plurality of inlet openings 226 for flowing filler material to the stator vane. The filler material exerts a pressure force F against the nozzle plug. In the engaged position shown in FIG. 8, the nozzle plug carrier moves downwardly with respect to the nozzle plug allowing filler material to flow through the nozzle plug. In the disengaged position shown in FIG. 9, the nozzle plug carrier has moved upwardly and the nozzle plug has moved further into the opening in response to the force F. This closes access from the chamber to the inlet openings 226 in the nozzle plug.

As shown in FIG. 8, the sprue plate 62v has a nozzle adaptor 228 which extends spanwise into the opening 186 in the first part 148v of the tool member 184. The sprue plate, which includes the nozzle adaptor, is not heated by the injection machine except to the extent that heat is transferred to the sprue plate and nozzle adaptor by brief contact between the nozzle plug and the sprue plate as the stator vane is filled.

FIG. 8A is an enlarged viewable portion of FIG. 8. As shown in FIG. 8 and FIG. 8A, the nozzle adaptor 228 has a sealing surface 232. The sealing surface is a first spanwise facing surface which faces spanwise away from the stator vane in the operative condition. The sealing surface of the nozzle adaptor adapts the sprue plate to engage the nozzle plug 218 of the nozzle 70 under operative conditions of the fixture 54va. The nozzle adaptor is formed of a relatively hard, durable material, such as steel. This material is harder than the portion of the first part 148v of the tool member 184 that engages the stator vane. The harder material of the sealing surface is more suitable than the softer material for sealing against high pressures and enduring repetitive contact with the nozzle plug 218.

The nozzle adaptor 228 includes a duct 232 for receiving at least a portion of the nozzle plug 218. The nozzle adaptor has a first side 236 and a second side 238. The nozzle adaptor bounds a portion of the passage 65 for filler material which extends between the sides. The first side includes the sealing surface 232. The first side has an opening for the passage 65 extending through the fixture. The second side of the nozzle adaptor has a second spanwise facing surface 244. The second surface 244 faces spanwise toward the stator vane in the operative condition and bounds a portion of the first containment region 188.

The portion of the passage 65 for filler material in the nozzle adaptor 228 has a diameter D and a length L which is less than or equal to five times the diameter D of the passage. Thus, the sealing surface is closely spaced by a length which is less than five times the diameter D from the containment region. In particular embodiment shown, the stream of filler material will have a diameter which is about equal to the diameter D and wherein the length L of the passage in the second member is less than about one diameter D.

As mentioned earlier, the stream of filler material S in the nozzle adaptor passage receives very little heat relative to the stream of filler material in the nozzle plug. The sealing surface 232 of the nozzle adaptor 228 has a predetermined spanwise location in the stream S of filler material in the first part 148v of the tool member 184. This predetermined location of the sealing surface is nearer to the first containment region 188 than the sealing surface is to any point upstream of the tool member; and, in embodiment shown, of the remainder of the sprue plate 62v. This results in the relatively unheated length Lfu of material in the nozzle adaptor being less than the length of heated filler material Lfh in the nozzle. This reduces the spanwise length Lfu of relatively unheated filler material in comparison to a construction which has the filler material passage bounded by the entire spanwise length of the sprue plate and the tool member.

As shown, the nozzle adaptor 228 extends into the tool member 184. The tool member 54va extends around the nozzle adaptor 228 and is in faying contact with the nozzle adaptor. This provides a good mechanical seal about the nozzle adaptor. In an alternate embodiment, the nozzle adaptor might be supported from external structure having a support which extends through the first part 148v of the fixture to engage the nozzle adaptor. The support might engage only a portion of a nozzle adaptor which has the sealing surface. In another embodiment, the nozzle adaptor might only include a support having a first side, a second side, a portion of the passage 65v and the sealing surface 232.

Figure 9:
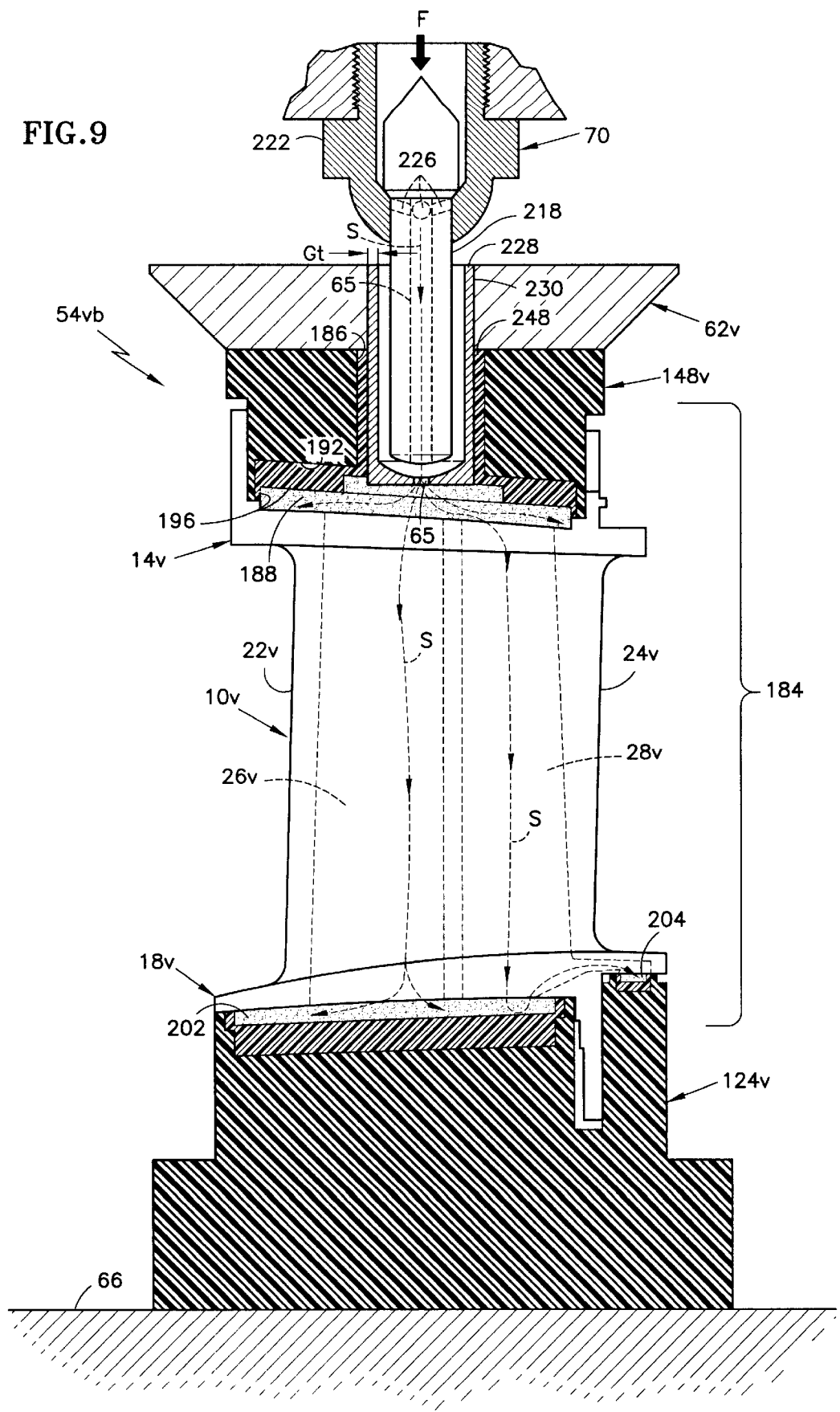
FIG. 9 is a cross-sectional view of an alternate embodiment of the fixture shown in FIG. 8

FIG. 9 is an alternate embodiment 54vb of the fixture 54va shown in FIG. 8. The nozzle adaptor 228 extends into the tool member 184 as in the FIG. 8 construction. The first part 148v of the tool member 184 extends around the nozzle adaptor and is spaced from the nozzle adaptor leaving a gap Gt therebetween. In this embodiment, an annular sleeve 248 of the masking material extends outwardly from the layer of masking material 196 in the first containment region 188. As a result of filler material penetrating into the gap Gt, the opening 186 (interior surface) of the first part 148v is in faying contact with masking material and the exterior surface 230 of the nozzle adaptor is in faying contact with masking material. Under operative conditions, any filler material which forces its way between the nozzle adaptor and the first part of the fixture must necessarily contact masking material along one side of the spanwise length of the filler material. Thus, a single layer of filler material may contact either the nozzle adaptor 228 or the first part 148v but will not contact both.

Certain thermoplastic polymers have characteristics which aid in disposing the laser blocking material 52 on the interior of the rotor blade 10 or of the stator vane 10v and in attenuating the intensity of the laser beam. These characteristics provide advantages during filling and drilling of the airfoil with a laser and advantages later as the blocking material is removed from the airfoil. Polyamides, such as those that are used to form hot melt adhesives, have been found particularly useful with the large cavities and flat end surfaces of stator vanes. These adhesives are commonly used in the electronics industry for potting and encapsulating electronic components. Although the polyamide material contains amide groups (—CONH—), the material creates products of combustion which may be vented through an ordinary furnace vent without the need for special afterburner treatment. The material is very clean burning leaving behind an acceptably clean interior. The viscosity is acceptable with the viscosity of less than about seven hundred and fifty (750) centipoise at four hundred (400) degrees Fahrenheit (204 degrees Centigrade) and a softening point at or below three hundred and thirty (330) degrees Fahrenheit (165 degrees Centigrade). Thus, the material liquefies quickly with an increase in temperature of less than a hundred degrees Fahrenheit and exhibits properties very similar to shear thinning which is discussed below.

Experiments have been performed using the polyamide material. The material is injectable at pressures of from eight hundred (800) to twelve hundred (1200) pounds per square inch which is within the range of smaller injection molding machines at temperatures in the range of about two hundred and seventy-five to three hundred (275–300) degrees Fahrenheit. A particular advantage is the strong adhesive bond the material forms with metal, such as the material of the stator vane. This enables the adhesive material to stay in place adjacent the site for drilling a hole with a laser even though the passage adjacent the site may have a relatively large volume which exaggerates the effects of contraction of the material on cooling. The contraction effects may cause the material to otherwise pull away from the hole location as the material solidifies. One satisfactory material is Hysol 7901 material, a polyamide hot melt adhesive material, available from the Hysol Division (Hysol Engineering Adhesives), The Dexter Corporation, One Dexter Drive, Seabrook, N.H.

Another example is a laser blocking material comprising a thermoplastic polymer formed of only carbon and hydrogen. The thermoplastic polymer creates harmless products on complete combustion of the material during burnout of the material. The polymer also has a Melt Flow Index which is greater than about fifty (50) which promotes flow. The thermoplastic polymer is partially amorphous; but it is also partially crystalline such that the crystallinity is greater than forty percent (40%) to diffuse the beam of radiation from the laser.

Experiments have been performed using members of the polyolefin family. The term "polyolefin" and the particular forms of the polyolefins such as "polypropylene", "polyethylene", etc. include their copolymers and homopolymers. For example, these include linear low density polyethylene (LLDPE), low density polyethylene (LDPE), high density polyethylene (HDPE), polypropylene (PP).

One satisfactory material is a linear, low-density polyethylene available as Dowlex 2503 from the General Polymer Division of Ashland Chemical Company and is manufactured by the Dow Chemical Company, Midland, Mich. 48674. This polyethylene has a specific gravity of nine hundred and thirty seven thousandths (0.9370) at twenty three degrees Celsius (23° C.) and a Melt Flow Index of one hundred and five (105) using the standard of measurement set forth in ASTM D-1238-82 entitled "Flow Rates of Thermoplastics by Extrusion Plastometer." Melt Flow Index is determined for this polyethylene by flowing a number of grams of the polymer during a ten minute period through a known orifice at a temperature of one hundred and ninety degrees Celsius (190° C.) and under a load of about two and sixteen hundredths Kilograms (2.16 kg) which correspond to condition E of the ASTM standard. This polyethylene has an elongation at break of seventy five and two tenths percent (75.2%), a flexural modulus of seventy five thousand five hundred pounds per square inch (75500 psi), a tensile strength at break of eleven hundred pounds per square inch (1100 psi) and a tensile strength at yield of two thousand and ten pounds per square inch (2010 psi). The notched Izod impact strength is forty five hundredths (0.45) at sixty eight point two degrees Fahrenheit (68.2° F.) at one-hundred and twenty five thousandths 0.1250 inches (ft-lbs./in). The tensile impact strength is sixty two and four tenths (62.40 ft-lb./per square inch) at seventy three and two tenths degrees Fahrenheit (73.2° F.). The brittle temperature is thirty six degrees Fahrenheit (36° F.) and the Vicat Softening temperature is two hundred and twelve degrees Fahrenheit (212° F.). It is a copolymer of ethylene and Octene-1.

At temperatures over five hundred and seventy two degree Fahrenheit or three hundred degrees Celsius (572° F. or 300° C.) the material will release highly combustible gases. The specific gravity is less than one and may be even less than ninety five hundredths because it lies in a range of about eighty four hundredths to ninety seven hundredths (0.84 to 0.97) showing the absence of fillers. It has a fairly high molecular weight which is greater than one thousand (1000) and is formed of only carbon and hydrogen.

Polyolefins such as polypropylene, polyethylene, polybutylene, polyisoprene have the advantage of shear thinning coupled with their relatively good Melt Flow Index. The Melt Flow Index is measured at low shear conditions. As shearing of the polyethylene increases, the viscosity of the material precipitously decreases and may decrease as much as fifty percent (50%) or even greater amounts. These polyolefins are less viscous than the polyamides on the interior of the rotor blade. The polyoefins may contract more than polyamides. Nevertheless, polyolefins have proved very satisfactory in the relatively small passages of rotor blades.

An advantage of using the injection molding machine for injecting the laser blocking material with polyolefins, and, possibly to a lesser extent with polyamides, is that the machine itself and through the pressure it exerts, causes shear thinning of the material, prior to the material reaching the chamber 12 or containment region 188 causes shear thinning as it passes through the nozzle 70 and certainly for the polyethylene, causes shear thinning, if required, in the internal passages of the airfoil 10.

Like Melt Flow Index, the shear thinning characteristic is an empirically defined parameter, critically influenced by the physical properties and molecular structure of the polymer and the conditions of measurement. It is determined by using a capillary rheometer but the parameter is not commonly available for materials at all temperatures and pressures because scientists and engineers have not focused on the criticality of the parameter, for example, for filling components having very narrow passages.

As the material is flowed from small passages in the airfoil to large passages in the airfoil, the viscosity will increase as the polymer chains experience a smaller shear rate. However, as the polymer flows through the next smaller cross-sectional area, such as at the trailing edge, the material will once again shear thin because of the increased shear rate. The material will experience a decrease in viscosity and then will more easily flow through the smaller area. As the material flows out of the airfoil, the pressure on the material and temperatures of the material rapidly decreases, causing the material to expenence a precipitous increase in viscosity and not flow to locating surfaces on the airfoil. With the polyamides, a sudden decrease in temperature will cause the viscosity to suddenly increase and freeze the polyamide, blocking the material from flowing to unwanted locations. Accordingly, shear thinning is very helpful in filling modern airfoils with laser blocking material 52. Typically, the volume of the charge 74 of material injected into the airfoil is about five to ten percent (5% to 10%) greater than the internal volume of the airfoil to be filled to ensure complete filling of that volume. This volume of material must be forced into the airfoil, forced through the airfoil, and, to some extent, forced out of the airfoil to ensure complete filling of the airfoil. And yet, the material must have sufficient viscosity such that the material does run through the airfoil to unwanted locations on the airfoil surface. As mentioned, it must solidify in place fairly rapidly after injection as it flows into, through and out of the airfoil.

During the filling operation of the airfoil 10, for example, the thermoplastic polyethylene polymer is forced into the blade at an extrusion pressure greater than about fifteen hundred pounds per square inch (1500 psi) and at a temperature at about or greater than three hundred degrees Fahrenheit (300° F.). There is a decrease in viscosity due to temperature. The temperatures of the material are expected to range between two hundred and fifty and five hundred and forty degrees Fahrenheit (250° F.–540° F.) for most materials in the polyolefin family. This allows the material to flow with low viscosity through the airfoil with the temperature causing a decrease in viscosity and the shear thinning causing a further decrease in viscosity.

In one application using the Dowlex 2503 material, the polyethylene was extruded at a pressure of sixteen hundred pounds per square inch (1600 psi) into an airfoil having passages and orifices having a hydraulic diameter which was less than forty (40) mils. In some applications, the passages may have a hydraulic diameter which is less than thirty (30) and even less than twenty five (25) mils. It is expected that as the polyethylene is flowed through the airfoil passages, further shear thinning takes place in the especially restricted regions of the airfoil such as the leading edge or the trailing edge region of the airfoil. In these regions, pedestals and small diameter holes retard movement of the material into cavities into which holes extending to the surface are drilled. Nevertheless, these airfoils were successfully filled, in part, because of the shear thinning characteristic of the laser blocking material in the airfoil. In other trials, the material was injected at a pressure of about two thousand pounds per square inch (2000 psi) with a temperature of the material that was less than five hundred and forty degrees Fahrenheit (540° F.) and that was in the range of about four hundred degrees Fahrenheit to about five hundred degrees Fahrenheit (400° F. to 500° F.). Polypropylene was also used with good results at similar pressures and at temperatures above its melting point.

During filling of the airfoil shown in FIG. 1A, the airfoil is disposed in the mask 78 with the masking members 82, 84 urged against the airfoil by the first and second jaws 92, 94. As mentioned, the table or the lever might be adjusted slightly to accommodate any difference between the gap G and the gap G1. The mask members apply an external pressure to the airfoil which blocks the loss of laser blocking material which might pass through the flow directing surfaces of the airfoil to unwanted locations on the airfoil. The mask members also reinforce the thin wall of the airfoil (which in some cases may be as small as twenty (20) mils) against deflection as the high pressure polyethylene material flows through the airfoil.

The laser blocking material flows quickly into the interior of the airfoil, with filling of even complex shapes taking less than one-minute and some cases about thirty (30) seconds. A particular advantage is the relatively low melting temperature of the material. As a result, the thermal capacitance of the airfoil is such that it absorbs heat from the material without increasing in temperature by an amount which makes handling difficult. In some trials, operators were able to handle the airfoils after filling with bare hands or with light gloves.

Even though the material loses heat to the adjacent metal in the airfoil, the material continues to flow until it fills those areas that require the disposition of laser blocking material. Solidification of the material occurs rapidly as the material loses heat to the airfoil. As a result, the airfoil can then be moved to a new location even with shaking and without concern about the material liquefying.

Another advantage of the blocking material is the resiliency which it demonstrates in solid form. This allows for easy inspection of holes drilled by the laser to ensure that the laser has penetrated through to the blocking material. For example, one way of inspecting a hole to make sure the hole has been drilled through the wall of the airfoil, is to probe through the hole with a thin wire. The wire exhibits a different response on contact with the resilient polyethylene material as compared to the contact that it would have against a hard component, such as the material. In many cases, the laser blocking material has flowed into the hole to such an extent that visual inspection of the hole shows the presence of polyethylene, thereby confirming the existence of a through hole.

The polyamide material exhibits many of the favorable characteristics of the polyethylene material. For example, the material flows readily when heated, is resilient after hardening in the airfoil, and is workable at reasonable temperatures and pressures.

During filling of the airfoil (stator vane) with a filler material such as the polyamide material, the airfoil is disposed in the fixture 54v or the fixture 54va. The first end 14v of the stator vane engages the first part 148v of the tool member 184 and the second end 18v engages the second part 124v. The first part of the tool member is urged against the first end of the stator vane and the second part of the tool member is urged against the second end of the stator vane to block leakage of the filler material between the stator vane and the tool member. The nozzle plug engages the sealing surface 232 of the nozzle adaptor 228 with a pressure that blocks the leakage of the filler (laser blocking) material as the stream S of material flows through the passage 65. The material then flows to the containment regions 188, 202, 204. The walls bound each of the containment regions and form a plenum with the containment region for distributing filler material to the associated end of the stator vane and to the openings 26v, 28v.

As mentioned, the adhesive bond is strong enough so that the polyamide filler material does not pull away from the stator vane surfaces even though the material contracts as it cools. Polyethylene may pull away in such circumstances. The polyamide filler material is viscous enough to flow to the interior and viscous enough to not flow to unwanted exterior locations, in part because of the increase in viscosity with a small decrease in temperature. Accordingly, external masks may not be required as are required for rotor blades that are filled with polyethylene.

A strong adhesive bond between the filler material 52 and the tool member is blocked from forming on certain of the surfaces of the tool member 184 by the layers of masking material, such as the layers 196, 214. If not blocked, this bond in some experiments was so strong that the laser blocking material came away from the stator vane as the stator vane and the fixture were separated. Nonetheless, the material satisfactorily separated on certain spanwise extending surfaces of limited spanwise extent, such as surface 194 in fixture 54v and the second spanwise facing surface 244 on the second side 238 of the nozzle adaptor.

This strong adhesive bond is not a problem even in the gap Gt of fixture 54vb because of the presence of the sleeve of masking material 248. The sleeve of masking material ensures that the strong bond only forms on one spanwise surface of the filler material. This permits the filler material to separate at this location without unacceptably disrupting the filler material on the stator vane. Separation may or may not acceptably occur in some constructions where the filler material bonds with a strong adhesive bond on both spanwise extending surfaces in the gap Gt. This might occur for an element of filler material where the filler material is against the surface 130 on the nozzle adaptor; and, at the same element of filler material, the filler material is against the opening 186 in the tool member. A bond results with the polyurethane material of the tool member 184 (first part 148v) which, in some constructions, was greater than and is added to the bond of the filler material with the nozzle adaptor to prevent the filler material from releasing from the bond with the stator vane.

The bond is not a problem in the portion of the passage 65 where the stream of filler material extends through the nozzle adaptor 228. First, the length Lfu of the unheated filler material is reduced by having the nozzle plug extend through the main portion of the sprue plate 62v and through most, and in the embodiment shown, all, of the first part of the tool member to the sealing surface. This increases the length of the stream of filler material Lfh that is heated and that stays molten in between the repetitive filling of airfoils. Secondly, this construction using the nozzle adaptor places the sealing surface nearer to the first containment region 188 than to a location in the stream of the polyamide filler material that is upstream of the tool member. As a result, the sealing surface may be placed in dose proximity to the containment region even though the tool member is formed of a resilient material that accommodates tolerance variations in the stator vane.

In the embodiments shown for the stator vanes, the spanwise extent of the unheated filler material is small enough so that the pressurized heated filler material forces any solidified filler material out of that portion of the passage. Experimental trials have shown that a length Lfu of the unheated filler material that is greater than ten to twelve times the diameter D may block the flow of heated filler material through that portion of the passage. It is believed that a length Lfu that is less than five times the diameter D will prove satisfactory. Experimental trials have shown that a length Lfu that is less than the diameter D is satisfactory. Finally, this volume of material coupled with pressure and the small amount heat needed to raise the temperature of the filler material to its softening point ensures that the small plug of material does not interfere with filling of the larger cavities of the stator vane.

During the drilling of a hole with the laser beam L, the coherent radiation of the laser beam vaporizes a wall, of the airfoil, such as the suction wall 42 or pressure wall 44, to form a cooling air hole 46. As the laser beam breaks through the wall on the interior of the airfoil, the laser beam strikes the polyolefin (polyethylene) or the polyamide material disposed on the interior of the airfoil.

The polyolefin blocking material is particularly effective at preventing the laser beam from unacceptably damaging the walls on the interior of the airfoil. Although the phenomenon in not well understood, it is believed that the crystallinity of the polyolefins helps this process. It is also believed that the specific heat and melting point of the polyethylene is such that a small portion of the polyethylene immediately forms a fluid, either in gaseous form or in the form of a liquid, upon being struck by the laser beam. If gas, the polyethylene gas is formed of carbon and hydrogen, a combustible mixture, but with the no oxygen being supplied by the material (since the material itself is formed of only carbon and hydrogen). This avoids the formation of sooty particles.

The plasma of the vaporized polyethylene is transparent to the laser beam to such an extent that it apparently does not degrade the ability of the laser beam to finish the drilling of the hole. In addition, the fluid does not appear to degrade the formation of the hole and, in fact, moves into the hole and may enhance the ability of the laser to leave a clean hole without blocking of the hole as a result of splatter from molten wall material of the airfoil being sucked into the hole.

Experimental drilling operations have shown a marked decrease in wall blockage at completion of the drilling operation. The percent blocked holes in one run decreased from about fifty percent to sixty percent (50% to 60%) to less than ten percent (10%). This decreases the need for rework of the airfoil and promotes even distribution of cooling air in the finished article.

The polyamide material has also prove satisfactory on these points even though it does not appear to have a significant crystalline structure. The polyamide material appears to be at least as good as the polyethylene material in avoiding wall blockage. Although the phenomenon is not well understood, it is believed that strong adhesive bond between the polyamide material and the stator vane enables the filler material to decrease wall blockage by preventing the formation of gaps between the filler material and the vane.

These gaps in some constructions using polyethylene may allow a small amount of debris from the drilling operation to fuse to the wall at a location adjacent to the hole. Nevertheless, a satisfactory hole was formed using polyethylenes in rotor blades. If the hole is unsatisfactory, it is believed that use of the polyamide material with a rotor blade would have the advantages discussed above provided the viscosity and cost benefits of the polyolefins did not outweigh the advantages of using polyamide materials. Another advantage of the polyethylene filler material in laser drilling is believed to be the amount of diffusion of the laser radiation that takes place for an incremental thickness of polyethylene material. It is believed that it is greater than many other materials used for blocking laser radiation. This may be linked to the relatively high crystallinity of polyolefins which is greater than forty percent (40%) and for the Dowlex polyethylene material, greater than sixty percent (60%). It is believed that polyolefins are preferable to other polymers because of the Melt Flow Index which is greater than fifty (50) and the melting point which is sufficiently high such that the large quantities of laser blocking material are not completely melted by the laser beam. As a result, in some drilling operations an additional pulse of laser energy beyond that experienced using conventional wax fill is possible, which also helps form a clean exit hole with minimal blocking by backscatter of the airfoil material.

It is possible to combine with the polyolefin small amounts of other polymers. One example is less than about five percent (5%) by weight of the other polymers as long as the other polymers do not degrade the performance of the polyolefin and do not pose an environmental risk on burnout of the material.

The addition of these other polymers to the polyolefin, or even additional amounts of other material to the thermoplastic polymer, is a concern because thermoplastic polymers formed of only carbon and hydrogen provide a significant advantage during removal of laser blocking material after the holes are drilled in the airfoil. One method of removing the laser blocking material is to heat the laser blocking material until it burns. One satisfactory temperature is about thirteen hundred (1300° F.) degrees Fahrenheit. A particular advantage of the polyolefin family and particularly polyethylene is the polymer breaks down to form a highly combustible gas which is very clean burning. The carbon and hydrogen of the polyethylene combine with oxygen from the combustion atmosphere to form carbon dioxide and water vapor. This leaves behind a very clean airfoil that does not require further processing to remove contaminants from the interior of the airfoil. Scrubbers for removing harmful gases from the burnout operation are not required provided significant oxygen is present to completely combust the laser blocking material. Finally, burnout provides the advantage of not having to flow additional solvents into the blade or to manipulate the blades.

In addition, the polyolefins have a relatively low melting temperature, particularly the polyethylenes. As the airfoil is heated to a higher temperature to remove the polyethylene by burning the polyethylene, the polyethylene melts and runs out of orifices in the blade instead of continuing to expand and place unwanted internal pressures on the airfoil.

Finally, the polyethylene has a resiliency characteristic prior to melting that allows the material to deform upon being deflected under load. The polyethylene material expands prior to melting as it is heated during the burnout operation. Expansion of the solid polyethylene material causes the material to deform, and openings in the airfoil may even allow the material to extrude so that all forces generated by thermal expansion of the material are not transmitted to the walls of the airfoil. The relatively thin walls of the airfoil are not deflected to an extent that would cause harmful residual stresses in the airfoil or failure of the airfoil during the burnout operation. In addition, burnout may be provided at a relatively low temperature to speed handling or at higher temperatures to decrease processing time as long as the temperature does not degrade the performance of the alloy from which the airfoil is made.

Although the invention has been shown and described with respect to detailed embodiments thereof, it should be understood by those skilled in the art that various changes in form and detail may be made without departing from the spirit and scope of the claimed invention.

We claim:

1. For an article having an end and an opening which extends inwardly from the end and for means for providing filler material which is heated to liquefy the material and is provided under pressure through a nozzle, a fixture having a passage for flowing a stream of heated filler material under an operative condition from the means to the article, and for not flowing the stream of filler material from the means to the article under an inoperative condition which comprises:

a tool member which is formed of a material softer than the material of the article and which is spaced from the end leaving a containment region therebetween through which the passage extends for flowing filler material, the tool member having at least one surface extending about the tool member which adapts the fixture to resiliently engage the end of the article under said operative condition to block the filler material from flowing out of the containment region at a location between the tool member and the article, and, a second member formed of material which is harder than the portion of the tool member which engages the article, the second member extending spanwise into the tool member and having a sealing surface which adapts the second member to engage the nozzle under said operative condition;

wherein under said operative condition, the nozzle of the means is adapted to be urged in faying contact against the sealing surface of the second member for blocking leakage of the pressurized filler material as the stream of pressurized filler material is flowed into the passage and the tool member is adapted to be urged against the article to block leakage of the filler material between the article and the tool member to bound the containment region and form a plenum with the containment region for distributing filler material to the end of the article and to the opening; and, wherein the sealing surface of the second member has a location in the stream of filler material in the tool member that is nearer to the containment region than to any point upstream of the tool member such that in the operative condition the spanwise length of filler material $L_{fu}$ in the passage through the second member is less than the spanwise length $L_{fh}$ of filler material in the portion of the nozzle that extends through the tool member which reduces the spanwise length $L_{fu}$ of relatively unheated filler material in the passage through the second member in the inoperative condition in comparison to the spanwise length Lfh of heated filler material in that portion of the nozzle which extends through the tool member.

2. The fixture for flowing a stream of filler material of claim 1, wherein the portion of the nozzle which extends into the tool member is a portion of a nozzle plug, wherein the passage for filler material in the second member has a diameter D and a length L which is less than or equal to five times the diameter D of the passage such that the sealing surface is closely spaced by a length which is less than five times the diameter D from the containment region.

3. The fixture for flowing a stream of filler material of claim 2 wherein the stream of filler material in the nozzle plug has a diameter which is about equal to the diameter D and wherein the length L of the passage in the second member is less than about one diameter D.

4. A method for providing heated filler material under pressure through a nozzle sequentially to at least two airfoils which includes a first airfoil and a second airfoil, each airfoil having an end and an opening which extends inwardly from the end using a fixture having a passage for flowing a stream of filler material under an operative condition from the means to the airfoil, which comprises:

forming a containment region by disposing a tool member formed of material softer than the airfoil adjacent the end of the first airfoil and engaging the end of the airfoil with a portion of the tool member and spacing the tool member from end of the airfoil;

forming a sealing surface for the nozzle of harder material than the tool member by disposing a nozzle adaptor in the tool member which has the sealing surface and which includes forming a passage in the nozzle adaptor for flowing filler material which extends downstream from the sealing surface, and which includes disposing the passage at a location in the tool member which is spanwise nearer to the containment region than to any point upstream of the tool member;

disposing a nozzle in the tool member which extends spanwise into the tool member;

engaging the nozzle adaptor with the nozzle in the tool member;

flowing a stream of filler material through the nozzle member, through the passage in the nozzle adaptor and to the containment region to provide filler material to the first airfoil;

removing the first airfoil after filling which includes leaving behind a spanwise length of filler material in the nozzle adaptor passage; and, engaging the second airfoil with the tool member;

providing heat to the portion of the nozzle which is disposed in the tool member during filling and prior to filling the second airfoil to provide filler material in the molten condition from the nozzle after the interval between removing the first airfoil and engaging the second airfoil;

forcing the spanwise length of filler material in the passage in the nozzle adaptor from the nozzle adaptor with the molten filler material from the nozzle;

wherein the spanwise length of unheated filler material in the spanwise length of the tool member is reduced from the entire spanwise length of the tool member to the spanwise length of the nozzle adaptor passage by disposing the nozzle in the tool member and locating the sealing surface nearer to the containment region than to a point upstream of the containment region.

5. The method of providing filler material under pressure through a nozzle of claim 4 wherein means for providing filler material includes the nozzle, and, wherein the step of disposing a nozzle adaptor in the tool member includes disposing a sprue plate between the tool member and the means for providing filler material and supporting and positioning the nozzle adaptor from a first part of the sprue plate and extending the nozzle adaptor into the tool member; and, wherein the method further includes urging the first part of the sprue plate against the tool member to urge the tool member against the airfoil.

6. The method of providing filler material under pressure through a nozzle of claim 5 wherein the step of disposing the nozzle in the tool member includes disposing the nozzle in the nozzle adaptor and spacing the nozzle chordwise from the nozzle adaptor over at least a spanwise portion of the nozzle.

7. For an airfoil having an end and an opening which extends inwardly from the end and for means for providing filler material under pressure through a nozzle, a fixture having a passage for flowing a stream of filler material under an operative condition from the means to the airfoil, and for not flowing the stream of filler material from the means to the airfoil under an inoperative condition, which comprises:

a tool member which is formed of a material softer than the material of the airfoil and which is spaced from the end leaving a containment region therebetween through which the passage extends for flowing filler material, the tool member having at least one surface extending about the tool member which adapts the fixture to resiliently engage the end of the airfoil under said operative condition to block the filler material from flowing out of the containment region at a location between the tool member and the airfoil, and, a second member formed of material which is harder than the portion of the tool member which engages the airfoil, the second member extending spanwise into the tool member and having a sealing surface which adapts the second member to engage the nozzle under said operative condition;

wherein under said operative condition, the nozzle of the means is adapted to be urged in faying contact against the sealing surface of the second member for blocking leakage of the pressurized filler material as the stream of pressurized filler material is flowed into the passage and the tool member is adapted to be urged against the airfoil to block leakage of the filler material between the airfoil and the tool member to bound the containment region and form a plenum with the containment region for distributing filler material to the end of the airfoil and to the opening; and, wherein the sealing surface of the second member has a location in the stream of filler material in the tool member that is nearer to the containment region than to any point upstream of the tool member such that in the operative condition the spanwise length Lfu of filler material in the passage through the second member is less than the spanwise length Lfh of filler material in the portion of the nozzle that extends through the tool member which reduces the spanwise length Lfu of relatively unheated filler material in the passage through the second member in the inoperative condition in comparison to the spanwise length Lfh of heated filler material in that portion of the nozzle which extends through the tool member.

8. The fixture for flowing a stream of filler material of claim 7, wherein the portion of the nozzle which extends into the tool member is a portion of a nozzle plug, wherein the passage for filler material in the second member has a diameter D and a length L which is less than or equal to five times the diameter D of the passage such that the sealing surface is closely spaced by a length which is less than five times the diameter D from the containment region.

9. The fixture for flowing a stream of filler material of claim 8 wherein the stream of filler material in the nozzle plug has a diameter which is about equal to the diameter D and wherein the length L of the passage in the second member is less than about one diameter D.

10. The fixture for flowing a stream of filler material of claim 7 wherein the airfoil has a first end and a second end which are connected by the opening, wherein the second member is a nozzle adaptor and wherein the tool member has a first part which receives the nozzle adaptor and which engages the first end of the airfoil and the tool member has a second part which engages the second end of the airfoil and which has a second containment region which is in flow communication through the opening with the first containment region under said operative condition.

11. The fixture for flowing a stream of filler material of claim 10 wherein the airfoil is a stator vane.

12. The fixture for flowing a stream of filler material of claim 7 wherein the second member is a sprue plate and the sprue plate has a nozzle adaptor which extends into the tool member to form the sealing surface which is in close proximity to the containment region.

13. The fixture for flowing a stream of filler material of claim 8 wherein the tool member has at least one spanwise facing wall and at least one spanwise extending wall which bounds the containment region and wherein a masking material is disposed in a portion of the containment region to block filler material from contacting the spanwise facing wall of the tool member.

14. The fixture for flowing a stream of filler material of claim 13 wherein the masking material blocks filler material from contacting the spanwise extending wall.

15. The fixture for flowing a stream of filler material of claim 13 wherein the masking material does not block filler material from contacting the spanwise extending wall.

16. The fixture for flowing a stream of filler material of claim 7 wherein the second member is a nozzle adaptor, wherein the nozzle adaptor extends into the tool member and the tool member extends around the nozzle adaptor and is in faying contact with the nozzle adaptor.

17. The fixture for flowing a stream of filler material of claim 7 wherein the second member is a nozzle adaptor, wherein the nozzle adaptor extends into the tool member and the tool member extends around the nozzle adaptor and is spaced from the nozzle adaptor leaving a gap Gt therebetween.

18. The fixture for flowing a stream of filler material of claim 17 wherein the masking material disposed in the containment region extends into the gap Gt and wherein the gap Gt is filled with masking material.

19. For a stator vane having a first end, a second end spaced spanwise from the first end, and an opening which extends between the ends, and for means for providing filler material which is heated to liquefy the material and which is provided under pressure through a nozzle having a nozzle plug to the stator vane, a fixture having a passage for flowing a stream of heated filler material under an operative condition from the means to the stator vane, which comprises:

A. a tool member having
  a first part which is formed of a material softer than the material of the stator vane and which is spaced from the first end leaving a containment region therebetween through which the passage extends for flowing filler material, the tool member having at least one first surface extending about the tool member which faces in the spanwise direction and which adapts the fixture to resiliently engage the first end of the stator vane under said operative condition to block the filler material from flowing out of the containment region at a location between the tool member and the stator vane, and,
  a second part which is formed of a material softer than the material of the stator vane and which is spaced from the second end leaving a containment region therebetween through which the passage extends for flowing filler material, the tool member having at least one second surface extending about the tool member which faces in the spanwise direction and which adapts the fixture to resiliently engage the second end of the stator vane under said operative condition to block the filler material from flowing out of the containment region at a location between the tool member and the stator vane;

B. a sprue plate having a nozzle adaptor which extends spanwise into the first part of the tool member, which has a sealing surface formed of material which is harder than the portion of the tool member which engages the stator vane and which adapts the sprue plate to engage the nozzle under said operative condition, the nozzle adaptor including;
  a duct for receiving at least a portion of the nozzle plug,
  a first side having a first spanwise facing surface which faces spanwise away from the stator vane in the operative condition, which has an opening for the passage for receiving the pressurized filler material, and which has the sealing surface for engaging the nozzle plug,
  a second side having a second spanwise facing surface which faces spanwise toward the stator vane in the operative condition and which bounds a portion of the containment region;

wherein a sprue plate holder has a slot which adapts the sprue plate holder to receive the sprue plate and has means for preventing relative movement between the sprue plate and the sprue plate holder;

wherein in the installed condition the sprue plate holder is integrally attached to the means for providing the filler material and the nozzle is pressed against the sealing surface on the nozzle adaptor of the sprue plate for providing the stream of pressurized blocking material to the passage;

wherein under the operative condition the spanwise length of filler material in the nozzle adaptor passage is Lfu and the spanwise length of filler material in the portion of the nozzle that extends through the tool member is Lfh;

wherein in the operative condition the first part of the tool member is urged against the first end of the stator vane and the second part of the tool member is urged against the second end of the stator vane to block leakage of the filler material between the stator vane and the tool member by bounding each of the containment regions and forming a plenum with the containment region for distributing filler material to the associated end of the stator vane and to the opening; and, wherein the sealing surface of the nozzle adaptor has a location in the stream of filler material in the tool member that is nearer to the containment region than to any point upstream of the tool member which results in the length of relatively unheated filler material in the nozzle adaptor passage Lfu being less than the length of heated filler material Lfh in the nozzle which reduces the spanwise length Lfu of unheated filler material in comparison to a construction which has the filler material passage extend through the entire spanwise length of the sprue plate and the tool member.

20. The fixture for flowing a stream of filler material of claim 19, wherein the portion of the nozzle which extends into the tool member is a portion of the nozzle plug, wherein the passage for filler material in the second member has a diameter D and a length L which is less than or equal to five times the diameter D of the passage such that the sealing surface is closely spaced by a length which is less than five times the diameter D from the containment region.

21. The fixture for flowing a stream of filler material of claim 20 wherein the stream of filler material in the nozzle plug has a diameter which is about equal to the diameter D and wherein the length L of the passage in the second member is less than about one diameter D.

* * * * *